(12) United States Patent
Kishigami et al.

(10) Patent No.: US 9,322,905 B2
(45) Date of Patent: Apr. 26, 2016

(54) RADAR DEVICE

(71) Applicant: PANASONIC CORPORATION, Osaka (JP)

(72) Inventors: Takaaki Kishigami, Tokyo (JP); Takafumi Tokuhiro, Kanagawa (JP); Tadashi Morita, Kanagawa (JP)

(73) Assignee: Panasonic Corporation, Osaka (JP)

( * ) Notice: Subject to any disclaimer, the term of this patent is extended or adjusted under 35 U.S.C. 154(b) by 340 days.

(21) Appl. No.: 14/118,087

(22) PCT Filed: Mar. 12, 2013

(86) PCT No.: PCT/JP2013/001621
§ 371 (c)(1),
(2) Date: Nov. 15, 2013

(87) PCT Pub. No.: WO2013/140747
PCT Pub. Date: Sep. 26, 2013

(65) Prior Publication Data
US 2014/0085127 A1    Mar. 27, 2014

(30) Foreign Application Priority Data
Mar. 19, 2012  (JP) .................. 2012-062493

(51) Int. Cl.
*G01S 13/91* (2006.01)
*G01S 13/58* (2006.01)
(Continued)

(52) U.S. Cl.
CPC . *G01S 13/58* (2013.01); *G01S 7/41* (2013.01); *G01S 13/284* (2013.01); *G01S 13/581* (2013.01);
(Continued)

(58) Field of Classification Search
CPC ..... G01S 13/58; G01S 13/581; G01S 13/284; G01S 13/92; G01S 7/41; G01S 13/91; G01S 13/003; G01S 13/878; G01S 2007/4091; G08G 1/052; G08G 1/015
USPC ........... 342/108, 107, 90, 189, 195; 340/928, 340/933
See application file for complete search history.

(56) References Cited

U.S. PATENT DOCUMENTS

| 5,101,200 A * | 3/1992 | Swett ................. G06Q 30/0284 235/437 |
| 7,045,787 B1 * | 5/2006 | Verbinski ............... G01N 23/02 250/358.1 |

(Continued)

FOREIGN PATENT DOCUMENTS

| EP | 0 636 900 A2 | 2/1995 |
| JP | 52-128168 A | 10/1977 |

(Continued)

OTHER PUBLICATIONS

International Search Report, mailed Apr. 16, 2013, for PCT/JP2013/001621, 2 pages.

(Continued)

*Primary Examiner* — John B Sotomayor
(74) *Attorney, Agent, or Firm* — Seed IP Law Group PLLC

(57) ABSTRACT

A radar transmitting unit Tx transmits a radio-frequency radar transmission signal from a transmission antenna which is inclined in the direction of a depression angle φ. A radar receiving unit Rx estimates the height and speed of a vehicle which travels on a road surface using a reflected wave signal from the vehicle. A template generating unit generates a variation in a phase component of the reflected wave signal corresponding to N heights and speeds of the vehicle as N templates. N vehicle height/speed template correlation calculation units #1 to #Nrep calculate correlation on the basis of any one of the N templates and a correlation value between the reflected wave signal and a transmission code of the radar transmission signal.

13 Claims, 21 Drawing Sheets

(51) Int. Cl.
*G08G 1/015* (2006.01)
*G08G 1/052* (2006.01)
*G01S 7/41* (2006.01)
*G01S 13/92* (2006.01)
*G01S 13/28* (2006.01)
*G01S 13/00* (2006.01)
*G01S 13/87* (2006.01)
*G01S 7/40* (2006.01)

(52) U.S. Cl.
CPC ............... *G01S 13/91* (2013.01); *G01S 13/92* (2013.01); *G08G 1/015* (2013.01); *G08G 1/052* (2013.01); *G01S 13/003* (2013.01); *G01S 13/878* (2013.01); *G01S 2007/4091* (2013.01)

(56) References Cited

U.S. PATENT DOCUMENTS

| | | | | |
|---|---|---|---|---|
| 7,388,205 B1 * | 6/2008 | Verbinski | ............... | G01T 1/167 250/358.1 |
| 9,205,835 B2 * | 12/2015 | Stein | .................... | B60W 30/00 |
| 2011/0267200 A1 * | 11/2011 | Reynolds | ............. | G01G 19/024 340/666 |
| 2014/0232566 A1 * | 8/2014 | Mimeault | ............. | G01S 17/023 340/935 |

FOREIGN PATENT DOCUMENTS

| | | |
|---|---|---|
| JP | 58-25962 B | 5/1983 |
| JP | 05-052950 A | 3/1993 |
| JP | 11-272988 A | 10/1999 |
| JP | 2000-056013 A | 2/2000 |
| WO | 97/42520 A1 | 11/1997 |

OTHER PUBLICATIONS

Yumiba et al., "Study of Application of Automotive Millimeter-wave Radar to Traffic Counter," Institute of Electronics, Information, and Communication Engineers, Technical Report of IEICE, ITS2004-24(Sep. 2004), 31 pages.

Extended European Search Report dated Mar. 2, 2015, for corresponding EP Application No. 13765234.3 1812 / 2829893, 9 pages.

* cited by examiner

RADAR DEVICE

TECHNICAL FIELD

The present disclosure relates to a radar device which determines traveling speed and type of a vehicle.

BACKGROUND ART

A vehicle sensor is provided, for example, at the upper part of a pole on the road or on the side of the road and determines traveling speed or type of the vehicle which passes along a vehicle travel lane immediately below the vehicle sensor. In recent years, the application of a radar device using microwaves or millimeter waves to the vehicle sensor has been examined.

CITATION LIST

Patent Literatures

[PTL 1] JP-A-05-52950
[PTL 2] JP-B-58-25962

Non-Patent Literature

[NPL 1] Ryo Yumiba, "Study on Application of In-vehicle Millimeter-wave Radar to Vehicle Sensor", IPSJ SIG Technical Report, 2004-ITS-18, Sep. 28, 2004

SUMMARY OF THE INVENTION

Problems to be Solved by the Invention

However, the radar device according to the related art has a problem as the accuracy of determining the type of vehicle depends on the shape of the vehicle.

This disclosure has been made in view of the problems of the related art and an object of this disclosure is to provide a radar device that improves the accuracy of determining the type of vehicle, regardless of the shape of the vehicle.

Solution to Problem

According to a disclosure, there is provided a radar device configured to be installed at a position which is at a predetermined height from a road surface, comprising:

a radar transmitting unit configured to transmit a radio-frequency radar transmission signal from the position which is at the predetermined height to the road surface from a transmission antenna which is inclined in a direction of a predetermined depression angle; and a radar receiving unit configured to estimate a position parameter and a speed of a vehicle which travels on the road surface, using a reflected wave signal which is the radar transmission signal reflected from the vehicle which travels on the road surface, wherein the radar receiving unit includes:

a correlation calculation unit configured to calculate correlation on the basis of the reflected wave signal and a transmission code of the radar transmission signal;

a template generating unit configured to generate a variation in a phase component of the reflected wave signal corresponding to N position parameters and speeds of the vehicle as N templates;

N template correlation calculation units configured to calculate correlation on the basis of any one of the generated N templates and a correlation value between the reflected wave signal and the transmission code of the radar transmission signal; and an output selection unit configured to determine a type of the vehicle, using the position parameter and the speed of the vehicle corresponding to any one of the generated N templates, on the basis of outputs from the N template correlation calculation units.

Advantage of the Invention

According to this disclosure, it is possible to improve the accuracy of determining the type of vehicle, regardless of the shape of the vehicle.

MODE FOR CARRYING OUT THE INVENTION

Background to Lead to Content of Each Embodiment

First, the related art which uses a radar device in a vehicle sensor will be described as how to lead to the content of each embodiment with reference to FIGS. 19 to 21 before each embodiment of a radar device according to this disclosure is described.

Figure 19:
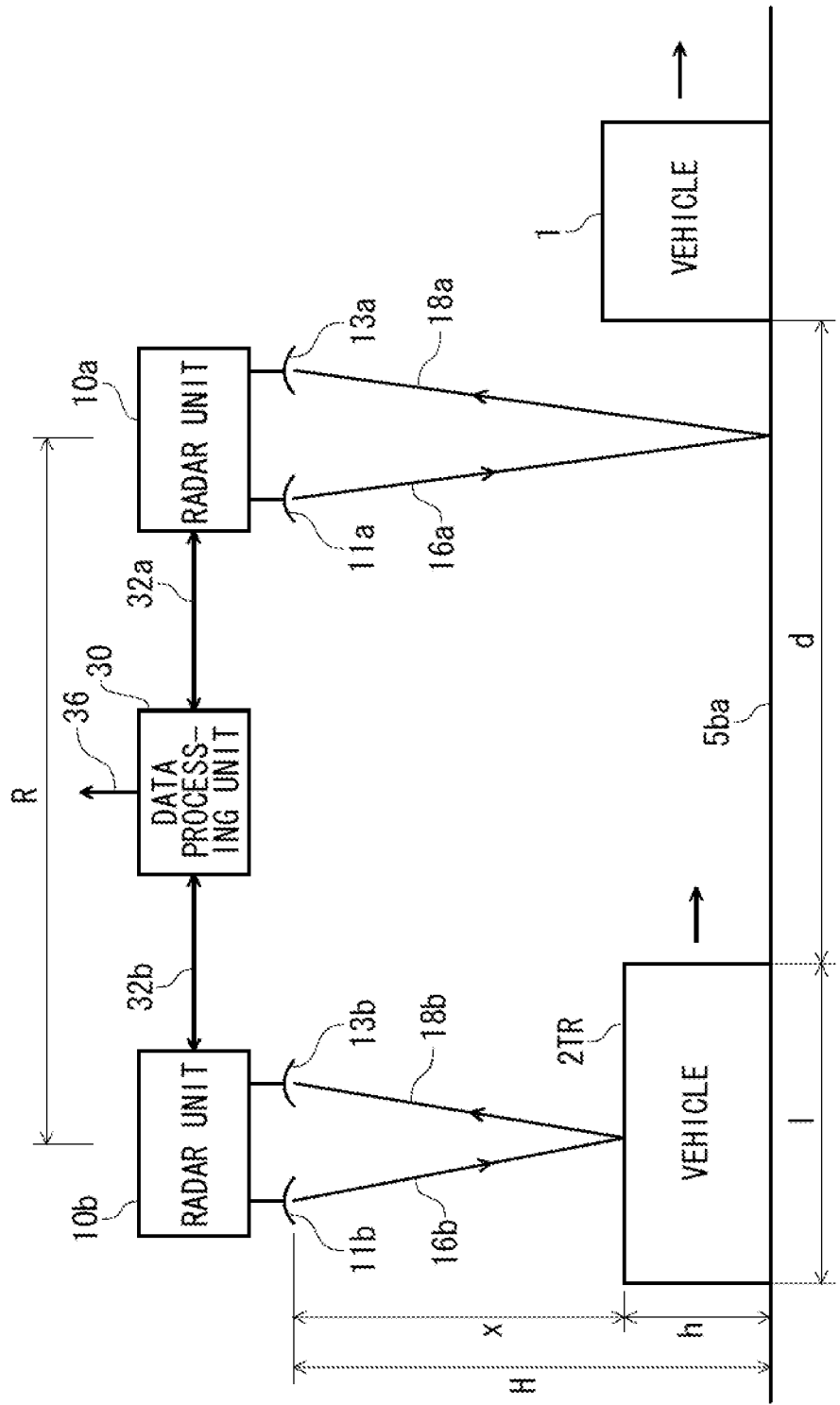
FIG. 19 is a diagram illustrating the structure of an example of a vehicle measurement system according to the related art.

FIG. 19 is a diagram illustrating the structure of an example of a vehicle measurement system according to the related art disclosed in Patent Literature 1. The vehicle measurement system shown in FIG. 19 includes a plurality of (for example, two) radar units 10a and 10b. The radar units 10a and 10b radiate radio waves 16a and 16b from antennas 11a and 11b to a reference plane 5ba and receive radio waves 18a and 18b reflected from the reference plane 5ba or a vehicle 2TR. The radar units 10a and 10b calculate the time required for the vehicle 2TR to pass through a distance R between the two radar units 10a and 10b from the radio waves 18a and 18b and calculate the length and speed of the vehicle on the basis of the passage time.

Figure 20:
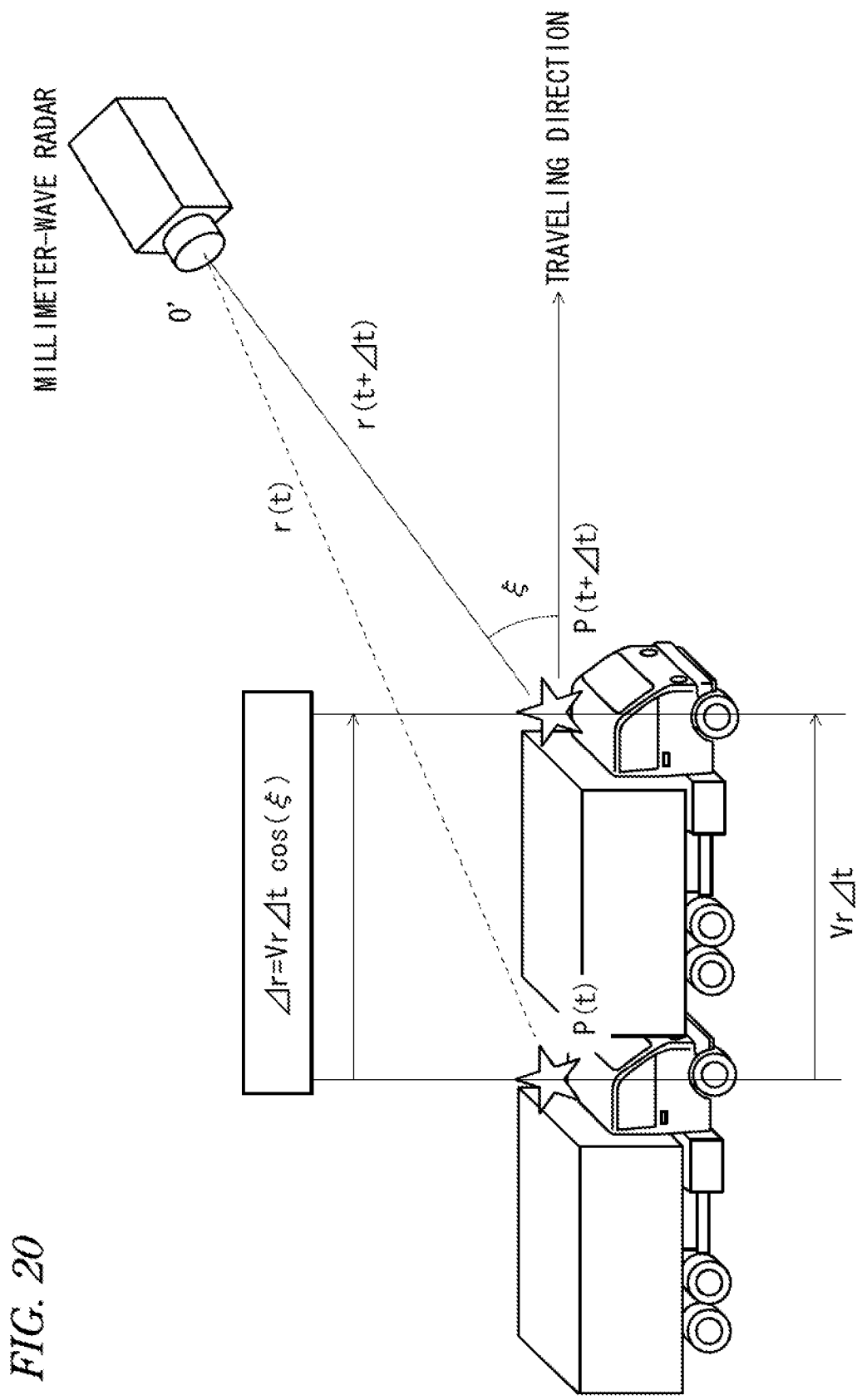
FIG. 20 is schematic diagram illustrating the relationship between the measurement speed of a millimeter-wave radar according to the related art and the speed of a vehicle in a road coordinate system.

FIG. 20 is a schematic diagram illustrating the relationship between the speed of the vehicle measured by the millimeter-wave radar according to the related art disclosed in Non-patent Literature 1 and the speed of the vehicle in the road coordinate system. In FIG. 20, the millimeter-wave radar obliquely radiates radio waves in the downward direction from the upper part of the pole which is installed on the road side to the road and receives waves reflected from a road surface and a road structure in the detection range within the beam width of the radiated radio waves.

When the vehicle enters the detection range, the millimeter-wave radar receives the waves reflected from the vehicle, calculates the distances r(t) and r(t+Δt) between the millimeter-wave radar and the vehicle at times t and (t+Δt), and calculates the traveling speed of the vehicle. In addition, the millimeter-wave radar calculates a relative speed v on the basis of the distances r(t) and r(t+Δt) and a time interval Δt, calculates the length of the vehicle from the relative speed v and the time interval Δt, and determines the type of vehicle.

Figure 21A:
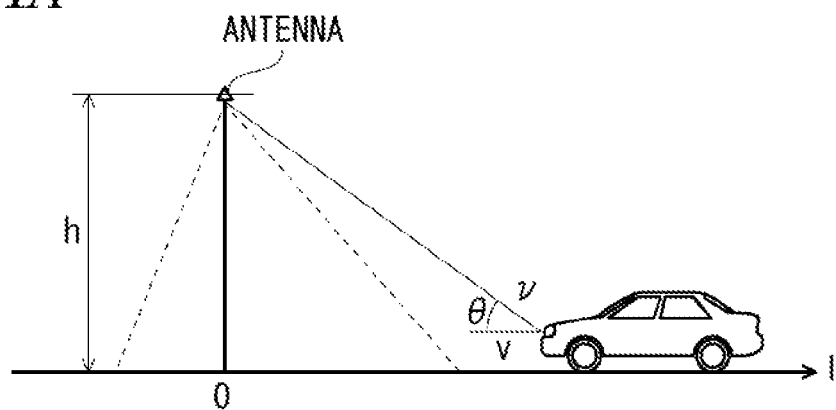
FIG. 21A is a diagram illustrating a Doppler signal detection band of a radar device according to the related art and FIG. 21B is a diagram illustrating the Doppler signal speed information of the radar device according to the related art.
Figure 21B:
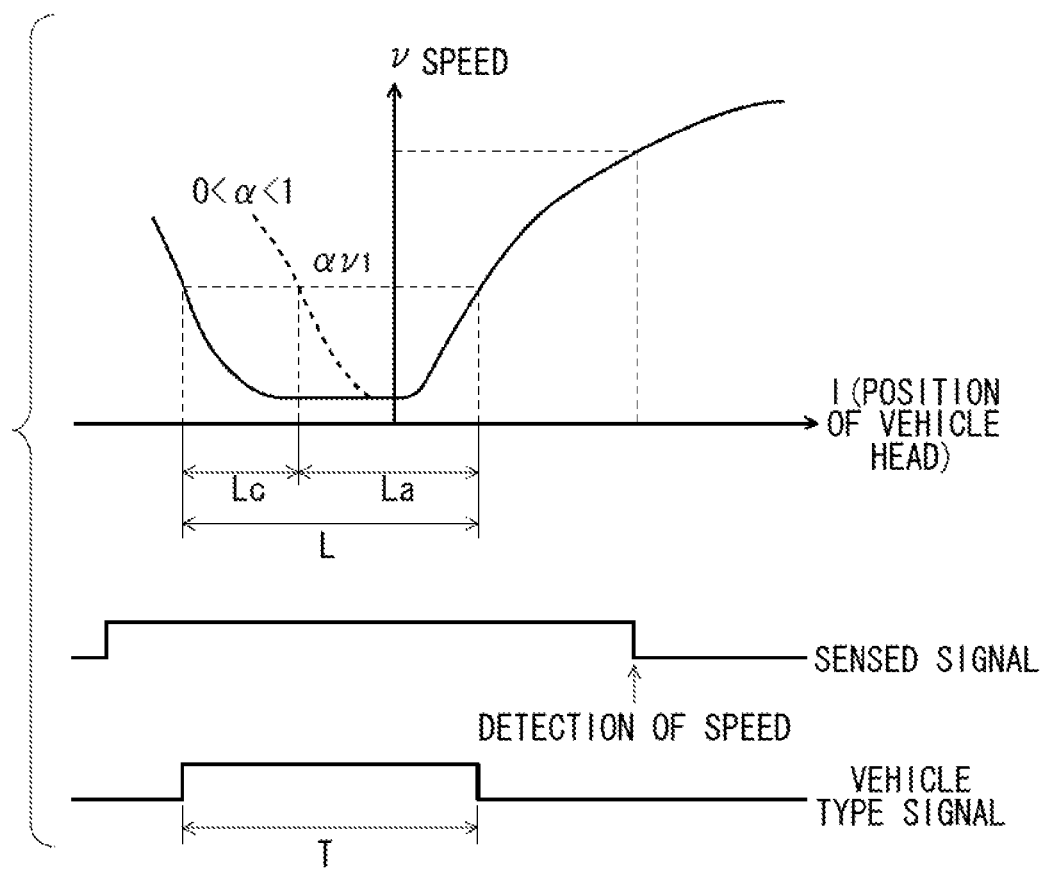

FIG. 21A is a diagram illustrating the Doppler signal detection band of the radar device according to the related art disclosed in Patent Literature 2 and FIG. 21B is a diagram illustrating the Doppler signal speed information of the radar device according to the related art. In FIG. 21A, the radar device obliquely radiates radio waves in the downward direction from the upper part of the pole which is installed on the road side to the road. In FIG. 21B, the Doppler signal speed information obtained when the vehicle travels is reduced as the distance of the vehicle to the antenna of the radar device is reduced, is the minimum immediately below the antenna, and increases when the vehicle passes immediately below the antenna.

The radar device detects a vehicle speed $v_1$ on the basis of a change in the Doppler signal speed information when an angle θ between the traveling direction of the vehicle and a line connecting the position where the antenna is installed and the reflection point of the radio waves is small and calculates $v_1T$ on the basis of a vehicle type signal (time T) in which a speed component v which varies depending on the passage of the vehicle satisfies $v<\alpha v_1$, $(0<\alpha<1)$. In this way, the radar device can determine the type and length of the vehicle.

However, in Patent Literature 1, a plurality of radar devices are needed and there are restrictions in installation costs and installation locations. In addition, in Non-patent Literature 1 and Patent Literature 2, the radar device detects the vehicle on the basis of the reflected wave signal from the leading end of the front surface of the vehicle and determines the type of vehicle. Therefore, in some cases, the reception level of the reflected wave signal from the leading end of the front surface of the vehicle is reduced depending on the shape of the vehicle.

For example, when the radar device detects the reflected wave signal from an intermediate portion of the vehicle as the reflected wave signal from the leading end of the front surface of the vehicle, an error occurs in the measurement of the length of the vehicle. Therefore, the accuracy of the radar device determining the type of vehicle is reduced.

In the following embodiments, an example of the radar device capable of improving the accuracy of determining the type of vehicle regardless of the shape of the vehicle will be described.

Each embodiment of the radar device according to this disclosure will be described with reference to the drawings.

First Embodiment

Radar Device 1

Figure 1A:
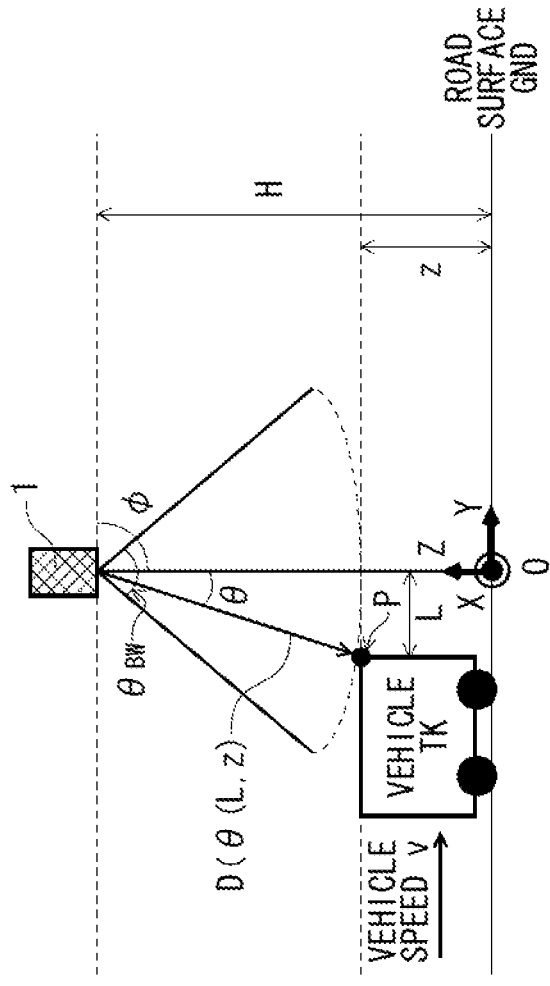
FIG. 1A is a schematic diagram illustrating the arrangement state of a radar device according to a first embodiment on the YZ plane and FIG. 1B is a schematic diagram illustrating the arrangement state of the radar device according to the first embodiment on the XZ plane.
Figure 1B:
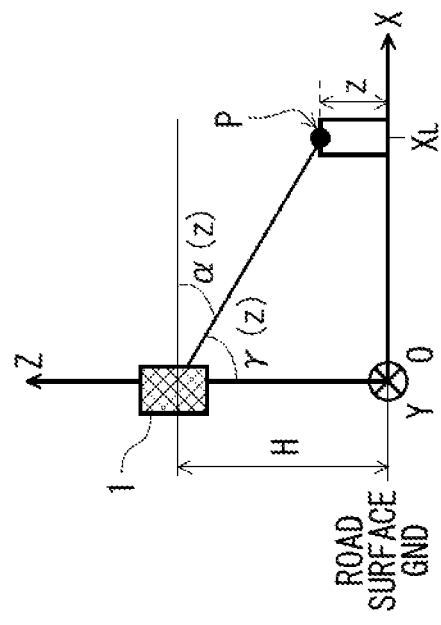
Figure 2:
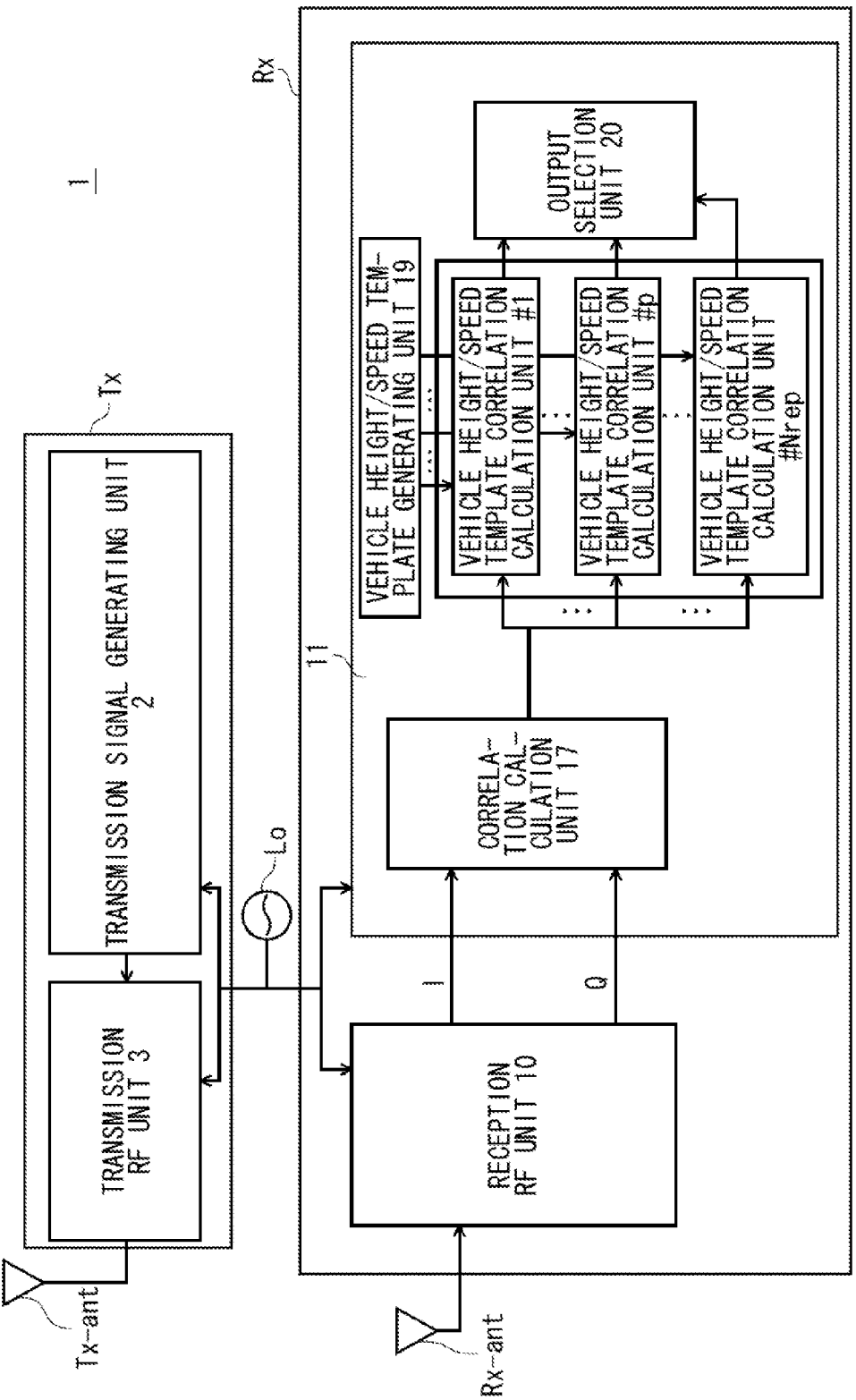
FIG. 2 is a block diagram illustrating briefly the internal structure of the radar device according to the first embodiment.
Figure 3:
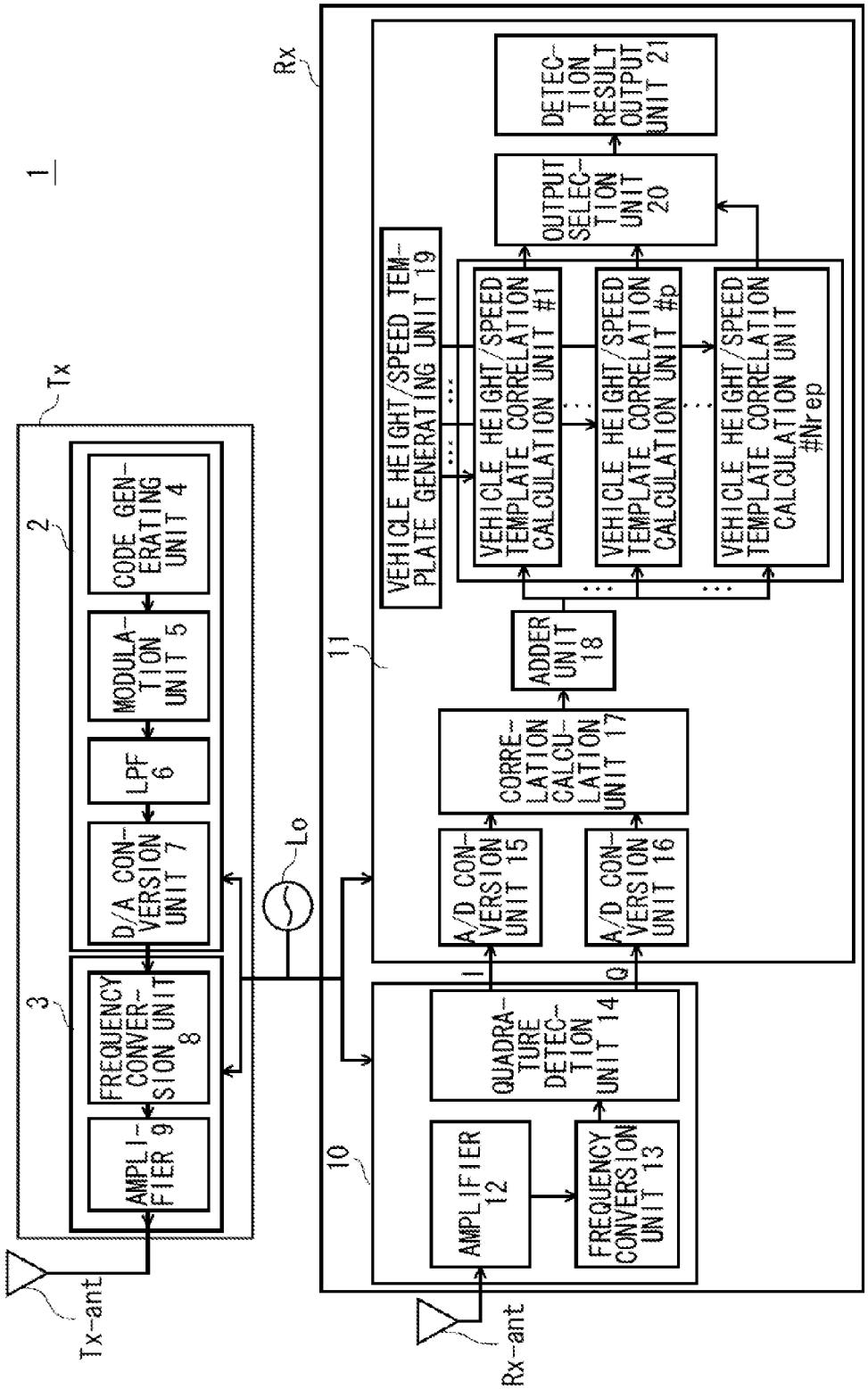
FIG. 3 is a block diagram illustrating in detail the internal structure of the radar device according to the first embodiment.
Figure 4:
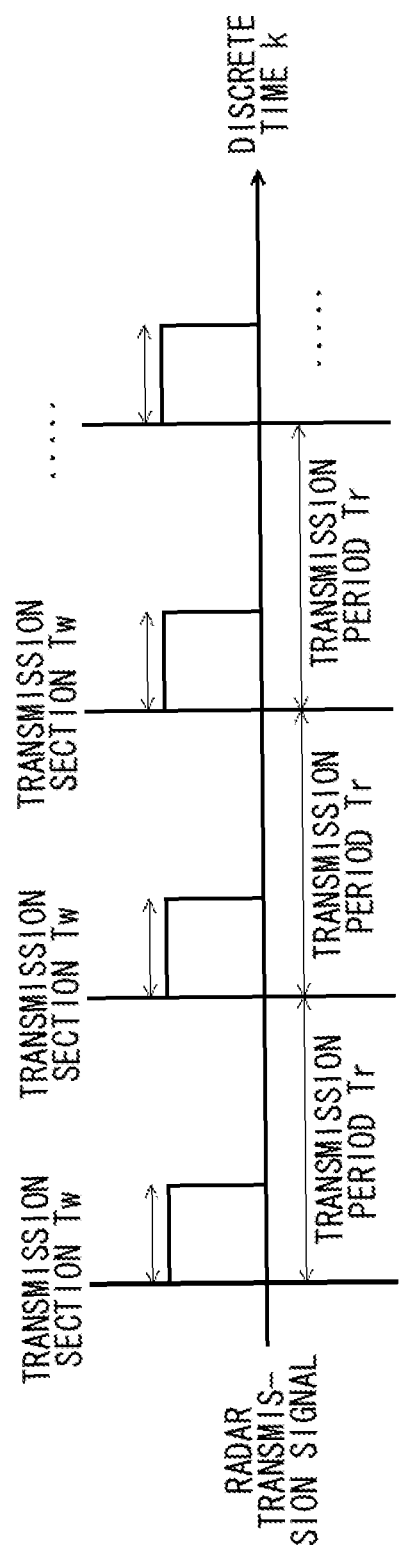
FIG. 4 is a diagram illustrating the relationship between a transmission section Tw and a transmission period Tr of a radar transmission signal.
Figure 5:
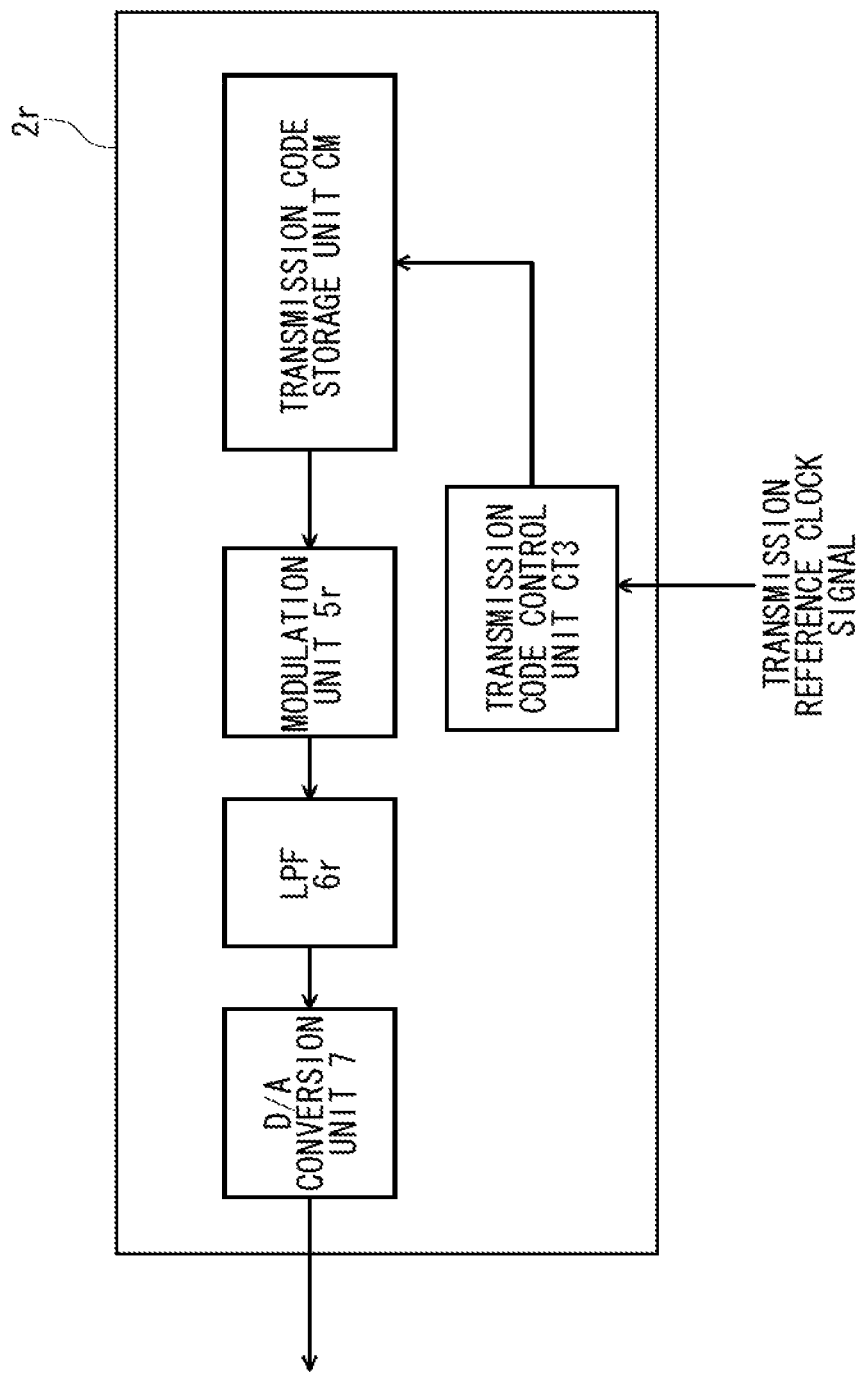
FIG. 5 is a block diagram illustrating the internal structure of a modification of a transmission signal generating unit.

FIG. 1A is a schematic diagram illustrating the arrangement state of a radar device 1 according to a first embodiment on the YZ plane and FIG. 1B is a schematic diagram illustrating the arrangement state of the radar device 1 according to the first embodiment on the XZ plane. FIG. 2 is a block diagram illustrating briefly the internal structure of the radar device 1 according to the first embodiment. FIG. 3 is a block diagram illustrating in detail the internal structure of the radar device 1 according to the first embodiment. FIG. 4 is a diagram illustrating the relationship between a transmission section Tw and a transmission period Tr of a radar transmission signal. FIG. 5 is a block diagram illustrating the internal structure of a modification of a transmission signal generating unit 2.

In FIGS. 1A and 1B, the traveling direction of a vehicle TK, which is a detection target of the radar device 1, is the positive direction of the Y-axis, a direction perpendicular to a road surface GND is the positive direction of the Z-axis, an axis perpendicular to the YZ plane is the X-axis, and a position on the XY plane which is immediately below the radar device 1 is the origin O. The vehicle TK with a height z is traveling in the +Y-axis direction at a speed v.

The radar device 1 is at a predetermined height H from the road surface GND and is installed at a pole immediately above a vehicle travel lane $X_L$ (the angle of view $\gamma(z)=0$) or above a vehicle travel lane which is at an angle of view $\gamma(0)$ with respect to the vehicle travel lane $X_L$, or a post on the side of the road (see FIG. 1B). In addition, the radar device 1 is inclined at a predetermined depression angle $\phi$ on the ZY plane. In this embodiment, the depression angle $\phi$ of the radar device 1 is 90° (see FIG. 1A).

In the following description, the angle between the direction from the radar device 1 to the road surface immediately below the radar device 1 and the direction of the path of the radar transmission signal transmitted from the radar device 1 to the vehicle TK with the height z on the XZ plane is referred to as the "angle of view $\gamma(z)$" (see FIG. 1B). In this case, the depression angle $\alpha(z)$ on the XZ plane is $\pi/2-\gamma(z)$.

The radar device 1 transmits the radar transmission signal generated by a radar transmitting unit Tx from a transmission antenna Tx-ant. The radar transmission signal is reflected from the vehicle TK and a reception antenna Rx-ant receives a reflected wave signal. The radar device 1 performs signal processing on the received reflected wave signal and estimates the height z and the speed v of the vehicle TK.

In each of the following embodiments, an example of the detection target of the radar device 1 is the vehicle TK. However, the detection target is not limited to the vehicle TK, but may be, for example, a person.

First, the structure of each unit of the radar device 1 will be described briefly.

The radar device 1 shown in FIG. 2 includes a reference signal oscillator Lo, the radar transmitting unit Tx, and a radar receiving unit Rx. The radar transmitting unit Tx includes a transmission signal generating unit 2 and a transmission RF unit 3 to which the transmission antenna Tx-ant is connected. The reference signal oscillator Lo is connected to the radar transmitting unit Tx and the radar receiving unit Rx, commonly supplies a signal from the reference signal oscillator Lo to the radar transmitting unit Tx and the radar receiving unit Rx to synchronize the processes of the radar transmitting unit Tx and the radar receiving unit Rx.

The radar receiving unit Rx includes a reception RF unit 10 to which the reception antenna Rx-ant is connected and a signal processing unit 11. The signal processing unit 11 includes at least a correlation calculation unit 17, a vehicle height/speed template generating unit 19, a total of Nrep vehicle height/speed template correlation calculation units #1 to #Nrep (p=1 to Nrep), and an output selection unit 20.

(Radar Transmitting Unit)

Next, the structure of each unit of the radar transmitting unit Tx will be described in detail with reference to FIG. 3.

The transmission signal generating unit 2 shown in FIG. 3 includes a code generating unit 4, a modulation unit 5, a low-pass filter (LPF) 6, and a D/A conversion unit 7. The LPF 6 may be provided outside the transmission signal generating unit 2 and the output of the LPF 6 is input to the D/A conversion unit 7.

The transmission RF unit 3 shown in FIG. 3 includes a frequency conversion unit 8 and an amplifier 9.

Next, the operation of each of the radar transmitting unit Tx will be described in detail.

The transmission signal generating unit 2 generates a transmission reference clock signal obtained by multiplying a reference signal by a predetermined value, on the basis of the reference signal generated by the reference signal oscillator Lo. Each unit of the transmission signal generating unit 2 operates on the basis of the generated transmission reference clock signal.

The transmission signal generated by the transmission signal generating unit 2 is modulated in the transmission section Tw [second] of the transmission period Tr shown in FIG. 4, using samples corresponding to the number (No) of transmission reference clock signals per code in a code sequence $C_n$ with a code length Lp. That is, the sampling rate of the transmission signal generating unit 2 is (No×Lp)/Tw. Therefore, in the transmission section Tw [second], the transmission signal is modulated using Nr (=No×Lp) samples. In each no-signal section (Tr−Tw) [second] of the transmission period Tr, the transmission signal is modulated using Nu samples.

The transmission signal generating unit 2 modulates the code sequence $C_n$ with the code length Lp to periodically generate a transmission signal r(k, M) in the baseband represented by Expression (1). Here, n is in the range of 1 to Lp and Lp indicates the code length of the code sequence $C_n$. In addition, j is an imaginary unit satisfying $j^2=-1$ and k indicates a discrete time based on (k=1) the start time of the transmission period Tr of the radar transmitting unit Tx, is in the range of 1 to (Nr+Nu), and is a discrete time indicating modulation timing for generating the transmission signal.

In addition, M indicates the ordinal number of the transmission period Tr of the radar transmission signal. The transmission signal r(k, M) indicates a transmission signal at the discrete time k of an M-th transmission period Tr and is the sum of an in-phase signal component I(k, M) and a quadrature signal component Q(k, M) multiplied by the imaginary unit j (see Expression (1)).

[Expression 1]

$$r(k,M)=I(k,M)+jQ(k,M) \quad (1)$$

The code generating unit 4 generates a transmission code of the code sequence $C_n$ with the code length Lp for each transmission period Tr. The element of the code sequence $C_n$ is formed by, for example, binary numbers [−1, 1] or quaternary numbers [1, −1, j, −j]. It is preferable that the transmission code include at least one of a code sequence, a Barker code sequence, a Golay code sequence, and an M sequence code forming a pair of complementary codes and a code sequence forming Spano codes since the radar device 1 has low range side lobe characteristics. The code generating unit 4 outputs the generated transmission code of the code sequence $C_n$ to the modulation unit 5. Hereinafter, for convenience, the transmission code of the code sequence $C_n$ is referred to as a transmission code $C_n$.

In order to generate a pair of complementary codes as the transmission code $C_n$, the code generating unit 4 generates transmission codes $P_n$ and $Q_n$ which alternately form a pair for each transmission period, using two transmission periods (2Tr). That is, the code generating unit 4 generates one transmission code $P_n$ forming the pair of complementary codes and outputs the generated transmission code to the modulation unit 5 in the M-th transmission period. The code generating unit 4 generates the other transmission code $Q_n$ forming the pair of complementary codes and outputs the generated transmission code to the modulation unit 5 in an (M+1)-th transmission period. Similarly, in the (M+2)-th and subsequent transmission periods, the code generating unit 4 repeatedly generates the transmission codes $P_n$ and $Q_n$ using two transmission periods, that is, the M-th and (M+1)-th transmission periods as a unit and outputs the generated transmission codes to the modulation unit 5.

The modulation unit 5 receives the transmission code $C_n$ output from the code generating unit 4, performs pulse modulation for the received transmission code $C_n$, and generates a transmission signal $r(k_{Tx}, M)$ in the baseband represented by Expression (2). The pulse modulation is amplitude modulation, amplitude shift keying (ASK), or phase shift keying (PSK), which holds for the following embodiments.

For example, the phase shift keying (PSK) is binary phase shift keying (BPSK) in phase modulation in which the code sequence $C_n$ is formed by, for example, a binary number [−1, 1] and is quadrature phase shift keying (QPSK) or four-phase PSK in phase modulation in which the code sequence $C_n$ is formed by, for example, a quaternary number [1, −1, j, −j]. That is, in the phase shift keying (PSK), a predetermined modulation symbol in a constellation on the IQ plane is allocated.

The modulation unit 5 outputs the transmission signals r(k, M) below a predetermined limited band among the generated transmission signals r(k, M) to the D/A conversion unit 7 through the LPF 6. The LPF 6 may be omitted in the transmission signal generating unit 2, which holds for the following embodiments.

The D/A conversion unit 7 converts digital transmission signals r(k, M) output from the modulation unit 5 into analog transmission signals. The D/A conversion unit 7 outputs the analog transmission signals to the transmission RF unit 3.

The transmission RF unit 3 multiplies the reference signal generated by the reference signal oscillator Lo by a predetermined value to generate a transmission reference signal in a carrier frequency band, on the basis of the reference signal. Each unit of the transmission RF unit 3 operates on the basis of the generated transmission reference signal.

The frequency conversion unit 8 receives the analog transmission signal output from the D/A conversion unit 7 and up-converts the transmission signal in the baseband using the received transmission signal and the transmission reference signal. The frequency conversion unit 8 generates a radio-frequency (for example, in a millimeter-wave band) radar transmission signal and outputs the generated radar transmission signal to the amplifier 9.

The amplifier 9 receives the radar transmission signal output from the frequency conversion unit 8, amplifies the level of the received radar transmission signal to a predetermined signal level, and outputs the amplified radar transmission signal to the transmission antenna Tx-ant. The amplified radar transmission signal is transmitted through the transmission antenna Tx-ant.

The transmission antenna Tx-ant transmits the radar transmission signal output from the transmission RF unit 3. The radar transmission signal shown in FIG. 4 is transmitted in the transmission section Tw of the transmission period Tr and is not transmitted in the no-signal section (Tr−Tw).

The signal obtained by multiplying the reference signal generated by the reference signal oscillator Lo by a predetermined value is commonly supplied to the transmission RF unit 3 and the reception RF unit 10. In this way, the processes of the transmission RF unit 3 and a plurality of reception RF units are synchronized with each other.

The transmission signal generating unit 2 may not include the code generating unit 4 and may include a transmission code storage unit CM which stores the transmission code $C_n$ generated by the transmission signal generating unit 2 in advance (see FIG. 5). The transmission code storage unit CM may store a pair of complementary codes, for example, the transmission codes $P_n$ and $Q_n$, in correspondence with the generation of the transmission codes, which are the pair of complementary codes, by the transmission signal generating unit 2. The transmission code storage unit CM is not limited to the first embodiment, but can be similarly applied to the following embodiments. A transmission signal generating unit 2r shown in FIG. 5 includes the transmission code storage unit CM, a transmission code control unit CT3, a modulation unit 5r, an LPF 6r, and a D/A conversion unit 7.

The transmission code control unit CT3 circularly reads the transmission code $C_n$ (or the transmission code $P_n$ and the transmission code $Q_n$ forming the pair of complementary codes) from the transmission code storage unit CM for each transmission period Tr, on the basis of the reference clock signal obtained by multiplying the reference signal output from the reference signal oscillator Lo by a predetermined value, and outputs the read transmission code to the modulation unit 5r. The operation subsequent to the output of the signal to the modulation unit 5r is the same as that in the modulation unit 5 and the LPF 6 and thus the description thereof will not be repeated.

(Radar Receiving Unit)

Next, the structure of each unit of the radar receiving unit Rx will be described with reference to FIG. 3.

The radar receiving unit Rx shown in FIG. 3 includes the reception RF unit 10 to which the reception antenna Rx-ant is connected to and the signal processing unit 11. The reception RF unit 10 includes an amplifier 12, a frequency conversion unit 13, and a quadrature detection unit 14. The signal processing unit 11 includes A/D conversion units 15 and 16, a correlation calculation unit 17, an adder unit 18, a vehicle height/speed template generating unit 19, a total of Nrep vehicle height/speed template correlation calculation units #p (p is in the range of 1 to Nrep and Nrep is a predetermined natural number), an output selection unit 20, and a detection result output unit 21.

The radar receiving unit Rx periodically calculates a signal processing section of the signal processing unit 11 for each transmission period Tr.

Next, the operation of each unit of the radar receiving unit Rx will be described in detail.

The radar transmission signal transmitted from the radar transmitting unit Tx is reflected as a reflected wave signal from a vehicle reflection portion P (see FIG. 1A) of the vehicle TK and the reception antenna Rx-ant receives the reflected wave signal. The signal received by the reception antenna Rx-ant is input to the reception RF unit 10.

The reception RF unit 10 multiplies the reference signal generated by the reference signal oscillator Lo by a predetermined value to generate a transmission reference signal in a carrier frequency band, on the basis of the reference signal, similarly to the transmission RF unit 3. Each unit of the reception RF unit 10 operates on the basis of the generated transmission reference signal.

The amplifier 12 receives a radio-frequency signal received by the reception antenna Rx-ant, amplifies the level of the received signal, and outputs the amplified signal to the frequency conversion unit 13.

The frequency conversion unit 13 receives the signal output from the amplifier 12 and down-converts the received radio-frequency signal using the received radio-frequency signal and the transmission reference signal. The frequency conversion unit 13 generates a received signal in the baseband and outputs the generated received signal to the quadrature detection unit 14.

The quadrature detection unit 14 performs quadrature detection for the received signal output from the frequency conversion unit 13 to generate the received signals including an in-phase signal and a quadrature signal. The quadrature detection unit 14 outputs the in-phase signal of the generated received signals to the A/D conversion unit 15 and outputs the quadrature signal to the A/D conversion unit 16.

The A/D conversion unit 15 samples the in-phase signal in the baseband which is output from the quadrature detection unit 14 for each discrete time k to convert the in-phase signal, which is analog data, into digital data. The A/D conversion unit 15 outputs an in-phase signal component of the converted digital data to the correlation calculation unit 17.

The A/D conversion unit 15 samples Ns transmission signals r(k, M) generated by the radar transmitting unit Tx per pulse width (pulse time) Tp (=Tw/Lp). That is, the sampling rate of the A/D conversion unit 15 is (Ns×Lp)/Tw=Ns/Tp.

Similarly, the A/D conversion unit 16 performs the same operation as that of the A/D conversion unit 15 for a quadrature signal in the baseband which is output from the quadrature detection unit 14 and outputs a quadrature signal component of the converted digital data to the correlation calculation unit 17. In addition, the sampling rate of the A/D conversion unit 16 is Ns/Tp.

Hereinafter, the signal which is converted by the A/D conversion units 15 and 16 and is received at the discrete time k of the M-th transmission period Tr is represented as a complex signal x(k, M) represented by Expression (2), using an in-phase signal component Ir(k, M) of the received signal and a quadrature signal component Qr(k, M) of the received signal.

[Expression 2]

$$x(k,M)=Ir(k,M)+jQr(k,M) \quad (2)$$

Figure 6:
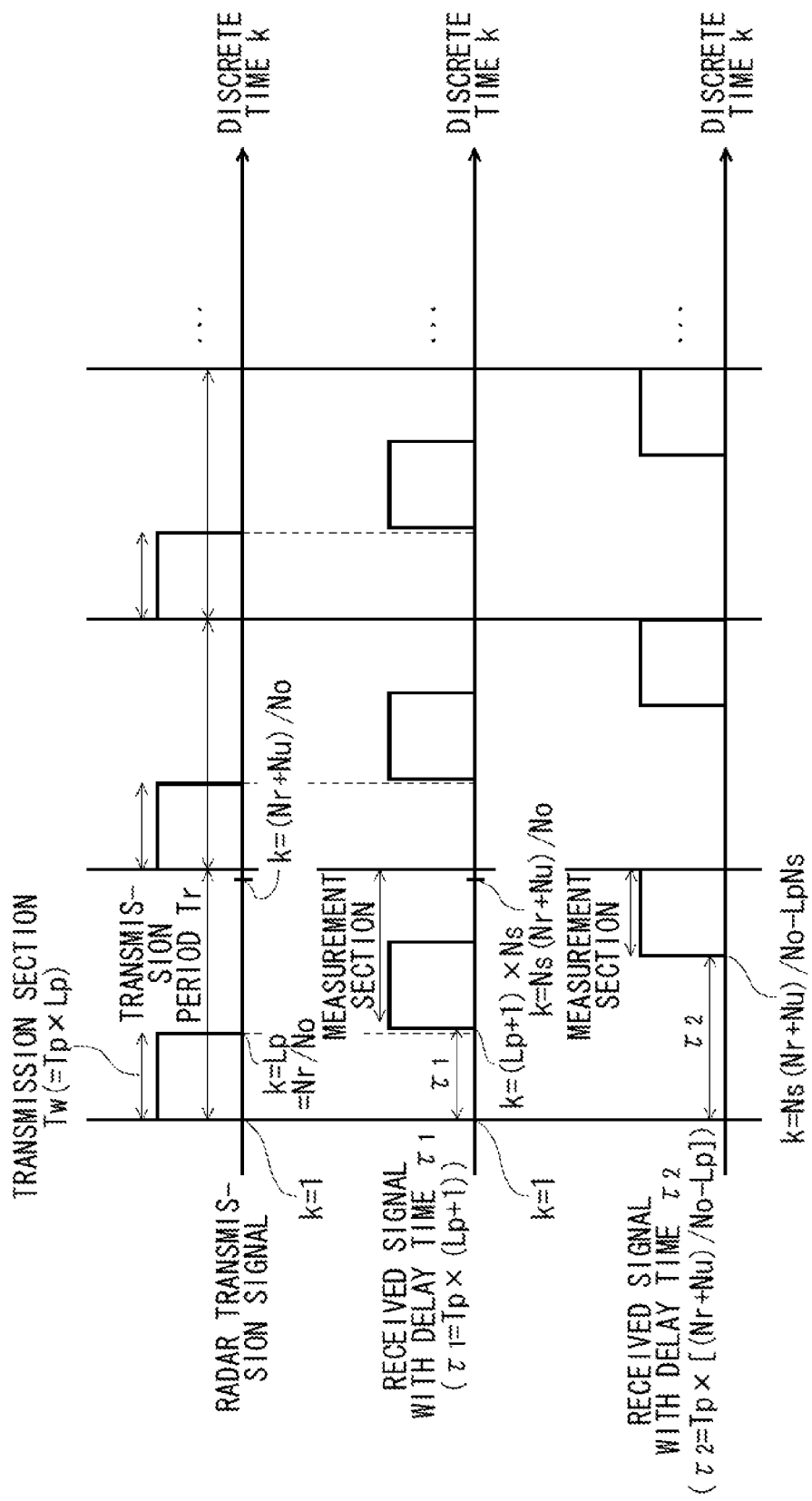
FIG. 6 is a diagram illustrating the relationship among a radar transmission signal, a received signal with a delay time $\tau_1$, and a received signal with a delay time $\tau_2$.

The first stage of FIG. 6 indicates the time when the radar transmission signal is received. In the first stage of FIG. 6, a reference point (k=1) of the discrete time k is the start time of each radar transmission period Tr and the signal processing unit 11 periodically operates up to k=Ns(Nr+Nu)/No which is a sample point before the radar transmission period Tr ends. That is, the signal processing unit 11 periodically operates at the discrete time k=1 to Ns(Nr+Nu)/No. The discrete time k=Ns(Nr/No) indicates a point of time immediately before the transmission section Tw ends in each transmission period Tr. Hereinafter, the digital received signal x(k, M) output from the A/D conversion units 15 and 16 is referred to as a "discrete sample value x(k, M)".

The correlation calculation unit 17 receives the discrete sample values Ir(k, M) and Qr(k, M) output from the A/D conversion units 15 and 16, that is, the discrete sample value x(k, M) as the received signal. The correlation calculation unit 17 periodically generates the transmission code $C_n$ with the code length Lp which is transmitted in each transmission period Tr shown in the first stage of FIG. 6 for each discrete time k, on the basis of the transmission reference clock signal obtained by multiplying the reference signal by a predetermined value. Here, n is in the range of 1 to Lp and Lp indicates the code length of the code sequence $C_n$.

The correlation calculation unit 17 calculates the sliding correlation value AC(k, M) between the received discrete sample value x(k, M) and the transmission code $C_n$. Here, AC(k, M) indicates a sliding correlation value at the discrete time k. Hereinafter, the sliding correlation value is simply referred to as a correlation value.

Specifically, the correlation calculation unit 17 calculates the correlation value AC(k, M) for each transmission period Tr shown in the first stage of FIG. 6, that is, for each discrete time k=1 to Ns(Nr+Nu)/No according to Expression (3). The correlation calculation unit 17 outputs the correlation value AC(k, M) for each discrete time k which is calculated according to Expression (3) to the adder unit 18. An asterisk (*) is a complex conjugate operator.

[Expression 3]

$$AC(k, M) = \sum_{n=1}^{Lp} x(k + Ns(n-1), M) C_n^* \quad (3)$$

The second and third stages of FIG. 6 indicate the time when the radar transmission signal is received. The second stage of FIG. 6 shows the range of a measurement period when the reception antenna Rx-ant receives the signal after a delay time $\tau_1$ has elapsed from the transmission start time of the radar transmission signal. The third stage of FIG. 6 shows the range of the measurement period when the reception antenna Rx-ant receives the signal after a delay time $\tau_2$ has elapsed from transmission start time of the radar transmission signal. The delay times $\tau_1$ and $\tau_2$ are represented by Expressions (4) and (5), respectively.

[Expression 4]

$$\tau_1 = Tp \times (Lp + 1) \quad (4)$$

[Expression 5]

$$\tau_2 = Tp \times \left\{ \frac{(Nr + Nu)}{No} - Lp \right\} \quad (5)$$

The correlation calculation unit 17 performs calculation at the discrete time k=1 to Ns(Nr+Nu)/No in each embodiment including this embodiment. In addition, the correlation calculation unit 17 may limit the measurement range, that is, the range of the discrete time k according to the range in which the vehicle TK, which is a measurement target of the radar device 1, is present. Therefore, the radar device 1 can further reduce the amount of calculation of the correlation calculation unit 17. That is, the radar device 1 can further reduce power consumption based on a reduction in the amount of calculation of the signal processing unit 11.

When the correlation calculation unit 17 calculates the correlation value AC(k, M) in the range of the discrete time k=Ns(Lp+1) to Ns(Nr+Nu)/No−NsLp, the radar device 1 can omit the measurement of the reflected wave signal in the transmission section Tw of the radar transmission signal.

Even when the radar transmission signal directly goes around to the radar receiving unit Rx, the radar device 1 can perform measurement while excluding the influence of wraparound. In addition, when the measurement range (the range of the discrete time k) is limited, each unit after the adder unit 18 operates in the limited measurement range. Therefore, it is possible to reduce the amount of throughput of each unit and reduce the power consumption of the radar device 1.

The adder unit 18 receives the correlation value AC(k, M) for each discrete time k which is output from the correlation calculation unit 17. The adder unit 18 adds the correlation value AC(k, M) for a period (Nc×Tr) corresponding to a predetermined number of (Nc) transmission periods Tr, on the basis of the correlation value AC(k, M) which is calculated for each discrete time k in the M-th transmission period Tr.

Specifically, the adder unit 18 adds the correlation value AC(k, M) for each discrete time k for the period (Nc×Tr) corresponding to a predetermined number of (Nc) transmission periods Tr to calculate an m-th added correlation value CI(k, m) for each discrete time k according to Expression (6). Here, Nc indicates the number of additions by the adder unit 18. In addition, m indicates the ordinal number of the number of additions when the number of additions Nc by the adder unit 18 is a unit. The adder unit 18 outputs the added correlation value CI(k, m) to Nrep vehicle height/speed template correlation calculation units #p. Here, p is in the range of 1 to Nrep and Nrep is a predetermined natural number.

[Expression 6]

$$CI(k, m) = \sum_{g=1}^{Nc} AC(k, Nc(m-1) + g) \quad (6)$$

The adder unit 18 suppresses a noise component included in the reflected wave signal in the time range in which the wave signal reflected from the vehicle TK has high correlation by the Nc additions of the correlation value AC(k, M) to improve the reception quality of the reflected wave signal (SNR: signal to noise ratio). Since the reception quality of the reflected wave signal can be improved, the adder unit 18 can improve the accuracy of estimating the height and speed of the vehicle TK.

In order obtain an ideal addition gain, the phase component of the correlation value AC(k, M) needs to be in a given range in the addition section in which the correlation value AC(k, M) is added Nc times. That is, when a target is moving, the phase component varies depending on the movement. Therefore, it is preferable that the number of additions Nc be set on the basis of the estimated maximum moving speed of the vehicle TK. As the estimated maximum moving speed of the vehicle TK increases, a variation in the Doppler frequency included in the wave signal reflected from the vehicle TK increases and the discrete time interval with a high correlation value is shortened. Therefore, the number of additions Nc is reduced and the effect of improving the gain using the addition of the adder unit 18 is reduced.

In each embodiment including this embodiment, the adder unit 18 is provided in the front stage of Nrep vehicle height/speed template correlation calculation units #1 to #Nrep. The addition gain of the output of the correlation calculation unit 17 is obtained by the addition operation of the adder unit 18 and the down sampling effect of a sample point is obtained. Therefore, it is possible to reduce the template length of each vehicle height/speed template correlation calculation unit. That is, it is possible to reduce the buffer circuit size of each vehicle height/speed template correlation calculation unit.

In each embodiment including this embodiment, the adder unit may not be provided in the radar device (Nc=0). In this case, since the down sampling effect of the sample point is not obtained, it is possible to respond to an increase in the amount of calculation of each vehicle height/speed template correlation calculation unit.

Figure 7A:
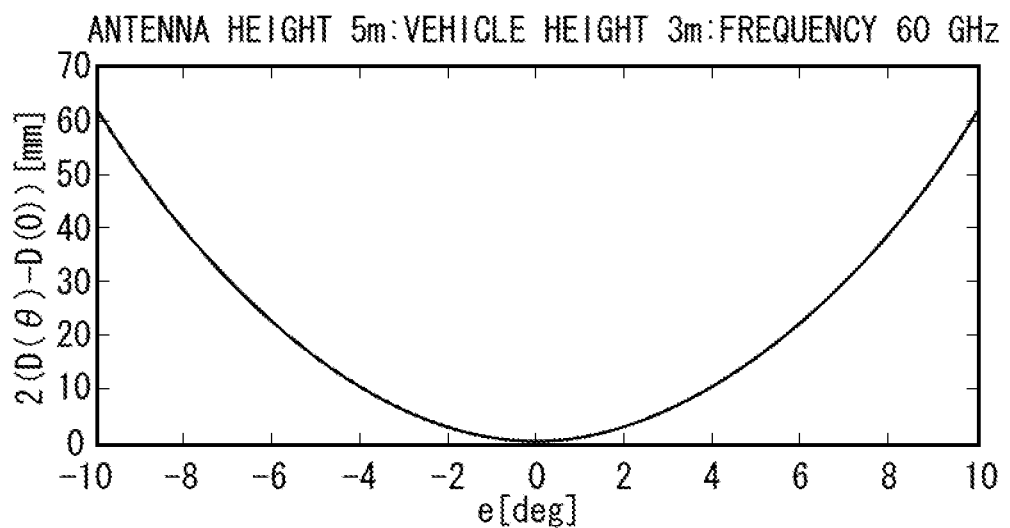
FIG. 7A is a graph illustrating a change in path difference when the height of an antenna is 5 m, the height of the vehicle is 3 m, and a frequency is 60 GHz
Figure 7B:
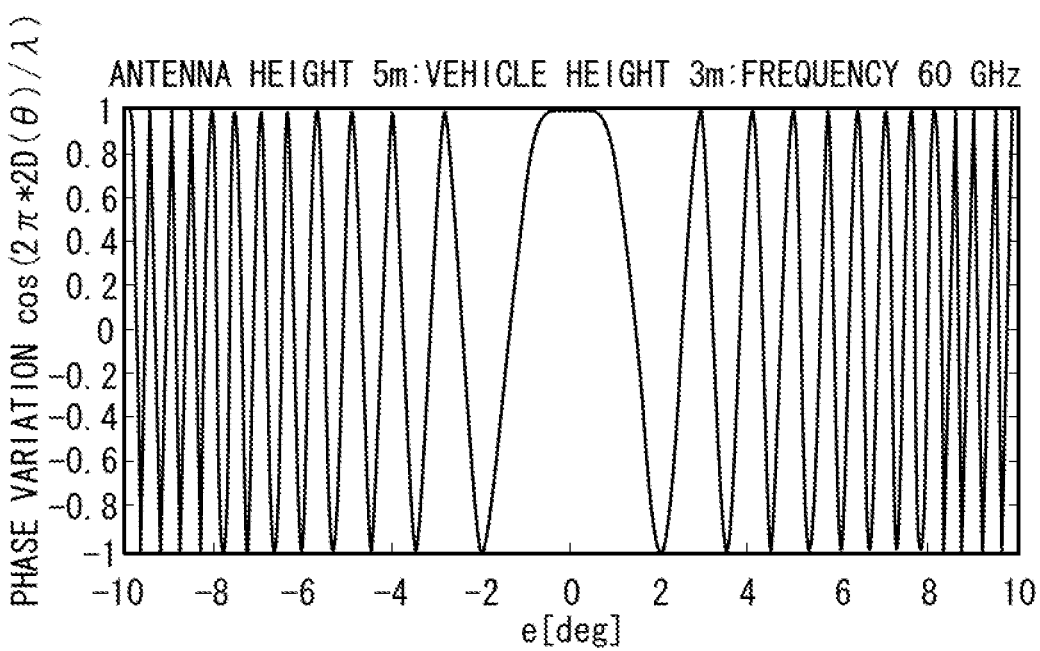
FIG. 7B is a graph illustrating a change in a phase component when the height of the antenna is 5 m, the height of the vehicle is 3 m, and the frequency is 60 GHz.
Figure 8A:
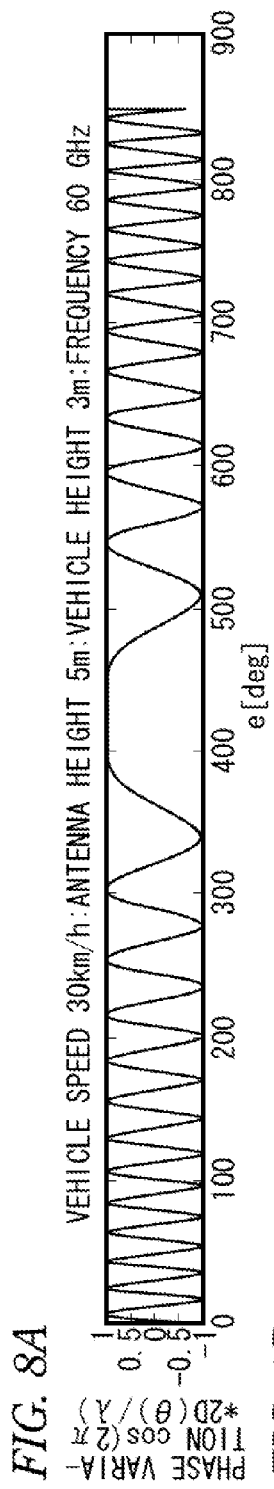
FIG. 8A is a graph illustrating a change in a real component of the phase of a template for each vehicle speed when the height of the antenna is 5 m, the height of the vehicle is 3 m, the frequency is 60 GHz, and the vehicle speed is 30 km/h.
Figure 8B:
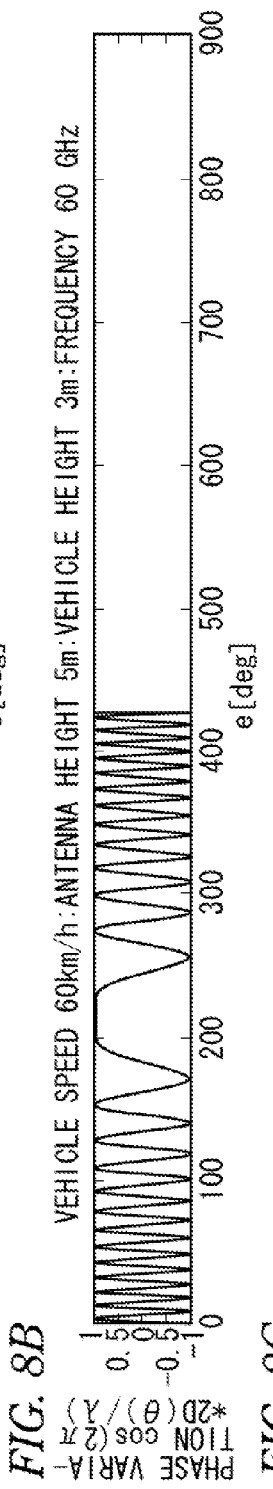
FIG. 8B is a graph illustrating a change in the real component of the phase of the template for each vehicle speed when the height of the antenna is 5 m, the height of the vehicle is 3 m, the frequency is 60 GHz, and the vehicle speed is 60 km/h.
Figure 8C:
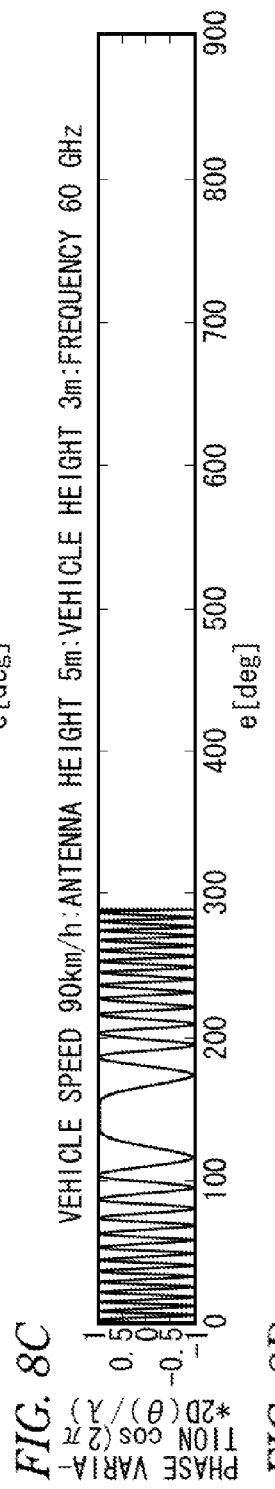
FIG. 8C is a graph illustrating a change in the real component of the phase of the template for each vehicle speed when the height of the antenna is 5 m, the height of the vehicle is 3 m, the frequency is 60 GHz, and the vehicle speed is 90 km/h.
Figure 8D:
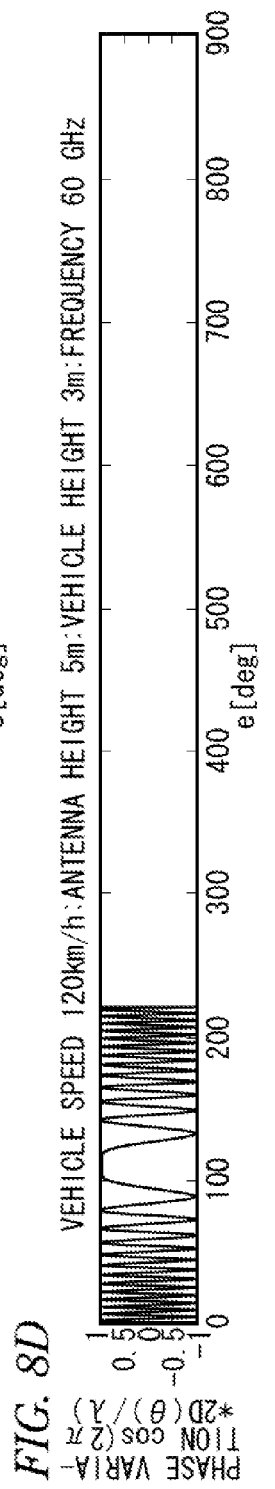
FIG. 8D is a graph illustrating a change in the real component of the phase of the template for each vehicle speed when the height of the antenna is 5 m, the height of the vehicle is 3 m, the frequency is 60 GHz, and the vehicle speed is 120 km/h.

The vehicle height/speed template generating unit 19 generates a vehicle height/speed template in which the reflection point of the radar transmission signal in the vehicle is assumed on the basis of the shapes of various types of vehicles, from parameters indicating the positional relationship between the radar device 1 and the vehicle which is traveling, on the basis of properties shown in FIGS. 7A and 7B. For example, FIG. 7A is a graph illustrating a change in path difference when the height of the antenna is 5 m, the height of the vehicle is 3 m, and the frequency is 60 GHz and FIG. 7B is a graph illustrating a change in phase component when the height of the antenna is 5 m, the height of the vehicle is 3 m, and the frequency is 60 GHz.

Next, the properties on which the vehicle height/speed template generating unit 19 focuses attention will be described. In FIG. 7A, while the vehicle reflection portion p is moving within the beam width $\theta_{BW}$ of the radar transmission signal (for example, about 20°), a path difference 2(D(θ(L, z))−D(θ(0, 3))) which depends on the height z from the road surface GND to the vehicle reflection portion p and the distance L on the Y-axis direction from a point immediately below the radar device 1 to the vehicle reflection portion p occurs in the reflected wave signal from the vehicle reflection portion p (see Expressions (7) and (8)). In FIG. 7A, the standard of the path difference is the point immediately below the radar device 1.

[Expression 7]

$$D(\theta(L, z)) = \frac{(H - z)}{\cos(\theta(L, z))\cos\gamma(z)} \quad (7)$$

[Expression 8]

$$\theta(L, z) = \tan^{-1}\left(\frac{L}{H - z}\right) \quad (8)$$

Therefore, a delay time Td until the radar device 1 receives the reflected wave signal, which the radar transmission signal reflected from the vehicle reflection portion p, is represented by Expression (9). In Expression (9), C indicates the speed of light. In FIG. 7B, a phase variation of exp(j4πD(θ(L, z))/λ) occurs in the reflected wave signal from the vehicle reflection portion p. Here, L varies between Lmin to Lmax when the point immediately below the radar device 1 is 0 (zero). In addition, the range from Lmin to Lmax corresponds to a position on the Y-axis in the range including the beam width $\theta_{BW}$.

[Expression 9]

$$Td = \frac{2D(\theta(L, z))}{C} \quad (9)$$

The vehicle height/speed template generating unit 19 generates a variation in the phase of the reflected wave signal corresponding to combinations of a plurality of heights $z_u$ and speeds $v_q$ [m/s] of one vehicle TK as a template $REP_{\#p}[z_u, v_q]$ according to Expression (10), on the basis of the properties shown in FIGS. 7A and 7B.

In Expression (10), #p indicates the ordinal number of combinations of parameter sets of a total of Nrep vehicle heights $z_u$ and vehicle speeds $V_q$ and is in the range of #1 to #Nrep. In addition, u, q, and Nrep are natural numbers and satisfy u×q=Nrep. In addition, $n_i$ is the number of samples of the phase component of the template $REP_{\#p}[z_u, v_q]$ and is in the range of 0 to floor[(Lmax−Lmin)/($v_q$×Trs)]. Here, floor [x] is an operator which rounds off the decimals of x and Trs indicates the sampling period of the A/D conversion units 15 and 16 and satisfies Trs=Tp/Ns.

[Expression 10]

$$REP_{\#p}[z_u, v_q](n_i) = \exp\left(j\frac{4\pi D(\theta(L_{min} + v_q \times Trs \times n_i, z_u))}{\lambda}\right) \quad (10)$$

FIG. 8 is a graph illustrating a variation in a real component of the template for each vehicle speed when the height of the antenna is 5 m, the height of the vehicle is 3 m, and the frequency is 60 GHz. FIG. 8A shows a case in which the vehicle speed is 30 km/h, FIG. 8B shows a case in which the vehicle speed is 60 km/h, FIG. 8C shows a case in which the vehicle speed is 90 km/h, and FIG. 8D shows a case in which the vehicle speed is 120 km/h. When the vehicle has the same height, the waveform is extended in the time-axis direction according to the vehicle speed.

The vehicle height/speed template generating unit 19 may generate a template obtained by quantizing a variation in the phase of the reflected wave signal corresponding to combinations of a plurality of vehicle heights $z_u$ and vehicle speeds $v_q$ with a predetermined number of bits (for example, 1 bit or 2 bits). When the variation is quantized with 1 bit, the template can be represented by a binary number. When the variation is quantized with 2 bits, the template can be represented by a quaternary number. Therefore, it is possible to reduce the storage capacity of the vehicle height/speed template generating unit 19 and reduce the circuit size of each of the vehicle height/speed template correlation calculation units #1 to #Nrep.

In this embodiment, the vehicle height/speed template is generated using the height of the vehicle which travels along the vehicle travel lane as a parameter. However, the template may be generated using a parameter (position parameter) indicating the positional relationship between the radar device 1 and the vehicle TK which passes through a detection target area, instead of the height z of the vehicle.

For example, the distance (=H−z) from the radar device 1 can be used as the parameter indicating the positional relationship between the radar device 1 and the vehicle TK which passes through the detection target area. In addition, since the position of the radar device 1 can be measured when the radar device 1 is installed, the distance from the radar device 1 to the vehicle TK can be calculated to measure the position of the vehicle TK. Therefore, when a vehicle distance/speed template is generated from the relationship between the distance from the radar device 1 and a path D(θ(L, z)), the same effect as described above is obtained, which holds for the following embodiments.

Since the vehicle height/speed template correlation calculation units #1 to #Nrep have the same operation, the vehicle height/speed template correlation calculation unit #p will be described as an example. The vehicle height/speed template correlation calculation unit #p calculates correlation according to Expression (12), using a template length Length ($REP_{\#p}$) (see Expression (11)) indicating the number of samples of a p-th template $REP_{\#p}[z_u, v_q](n_i)$ and Length ($REP_{\#p}$) added correlation values CI(k, m) which are obtained by the adder unit 18 for each discrete time k, while synchronizing the discrete time k. The vehicle height/speed template correlation calculation unit #p outputs a correlation value HV_CI(k, p, m), which is the result of the correlation operation, to the output selection unit 20.

[Expression 11]

$$\text{Length}(REP_{\#p}) = \text{floor}\left[\frac{Lmax - Lmin}{v_q \times Trs}\right] \quad (11)$$

[Expression 12]

$$HV\_CI(k, p, m) = \frac{1}{\text{Length}(REP_{\#p}[z_u, v_q])} \sum_{n_i=1}^{\text{Length}(REP_{\#p}[z_u, v_q])} CI(k, m+n_i)REP^*_{\#p}[z_u, v_q](n_i) \quad (12)$$

The output selection unit 20 determines whether there is a correlation value HV_CI(k, p, m) greater than a predetermined threshold value TH_Level on the basis of the correlation values HV_CI(k, p, m) from a total of Nrep vehicle height/speed template correlation calculation units #p (p is a natural number from 1 to Nrep). When it is determined that there is a correlation value HV_CI(k, p, m) greater than the predetermined threshold value TH_Level, that is, when Expression (13) is established, the output selection unit 20 determines that the vehicle TK passes within the beam width $\theta_{BW}$ of the radar device 1 and counts the number of passages of the vehicle TK for a vehicle flow rate. In Expression (13), $P_{sel}$ indicates the ordinal number of the template when Expression (13) is established.

[Expression 13]

$$HV\_CI(k, p_{sel}, m) > TH\_Level \quad (13)$$

The output selection unit 20 selects the vehicle height $z_u$ and the vehicle speed $v_q$ corresponding to the template $REP_{\#psel}[z_u, v_q](n_i)$ as the estimated values of the height and speed of the vehicle TK and determines the type of vehicle. The output selection unit 20 determines whether the vehicle is a large vehicle or a small vehicle as the type of vehicle on the basis of, for example, the height of the vehicle. The output selection unit 20 outputs the estimated values of the height and speed of the vehicle and the determination result of the type of vehicle to the detection result output unit 21.

When there are a plurality of outputs of the vehicle height/speed template correlation calculation units satisfying Expression (13), the output selection unit 20 may select the estimated values of the height and speed of the vehicle TK using the maximum value of the plurality of correlation values HV_CI(k, $p_{sel}$, m).

Alternatively, the output selection unit 20 may perform an interpolation process using each of the plurality of correlation values of the vehicle height/speed template correlation calculation units satisfying Expression (13) to select the estimated values of the height and speed of the vehicle TK. In this case, the radar device 1 can improve the accuracy of estimating the height and speed of the vehicle TK and reduce a circuit size, without increasing the number of templates.

The detection result output unit 21 transmits the output information (the determination result of the type of the vehicle TK and the estimated values of the height and speed of the vehicle TK) from the output selection unit 20 to a traffic system (not shown) which monitors the amount of traffic on the road through a network of a predetermined interface.

In this way, even when the reception level of the reflected wave signal from the vehicle reflection portion p of the vehicle TK is low due to the shape of the vehicle TK, the radar device 1 according to this embodiment can improve the accuracy of estimating the height and speed of the vehicle by the calculation of the correlation between the template of the phase variation of the reflected wave signal corresponding to the height and speed of the vehicle TK and the reflected wave signal. In addition, the radar device 1 adds the correlation value between the reflected wave signal and the radar transmission signal a predetermined number of times. Therefore, it is possible to improve the SNR of the reflected wave signal and further improve the accuracy of estimating the height and speed of the vehicle.

The radar device 1 is installed at a high place which is at a height H from the ground and the phase variation of the reflected wave signal due to a variation in the Doppler frequency is small in the range of about the beam width $\theta_{BW}$ close to the point immediately below the radar device 1. Therefore, the radar device 1 can reduce the sampling rate of the A/D conversion units 15 and 16 and reduce a circuit size.

The vehicle height/speed template generating unit 19 may generate the template according to Expression (14) using a real component or an imaginary component of the phase variation of the reflected wave signal corresponding to combinations of a plurality of heights $z_u$ and speeds $v_q$ [m/s] of one vehicle TK, which holds for the following embodiments. In Expression (14), Re[x] is an operator which gives a real number of a complex number x.

[Expression 14]

$$REP_{\#p}[z_u, v_q](n_i) = \mathrm{Re}\left[\exp\left(j\frac{4\pi D(\theta(L_{min} + v_q \times Trs \times n_i, z_u))}{\lambda}\right)\right] \quad (14)$$
$$= \cos\left(\frac{4\pi D(\theta(L_{min} + v_q \times Trs \times n_i, z_u))}{\lambda}\right)$$

The vehicle height/speed template correlation calculation unit #p calculates correlation according to Expression (12), using the template length Length($REP_{\#p}$) (see Expression (14)) indicating the number of samples of the p-th template $REP_{\#p}[z_u, v_q](n_i)$ and Length($REP_{\#p}$) added correlation values CI(k, m) which are obtained by the adder unit 18 for each discrete time k, while synchronizing the discrete time k. Since the processes after the output selection unit 20 are the same as described above, the description thereof will not be repeated.

The vehicle height/speed template generating unit 19 may generate the template according to Expression (15) using an imaginary component of the phase variation of the reflected wave signal corresponding to combinations of a plurality of heights $z_u$ and speeds $v_q$ [m/s] of one vehicle TK, which holds for the following embodiments. In Expression (15), Im[x] is an operator which gives a real number of a complex number x.

[Expression 15]

$$REP_{\#p}[z_u, v_q](n_t) = \mathrm{Im}\left[\exp\left(j\frac{4\pi D(\theta(L_{min} + v_q \times Trs \times n_i, z_u))}{\lambda}\right)\right] \quad (15)$$
$$= \sin\left(\frac{4\pi D(\theta(L_{min} + v_q \times Trs \times n_i, z_u))}{\lambda}\right)$$

The vehicle height/speed template correlation calculation unit #p calculates correlation according to Expression (12), using the template length Length($REP_{\#p}$) (see Expression (15)) indicating the number of samples of the p-th template $REP_{\#p}[z_u, v_q](n_i)$ and Length($REP_{\#p}$) added correlation values CI(k, m) which are obtained by the adder unit 18 for each discrete time k, while synchronizing the discrete time k. Since the processes after the output selection unit 20 are the same as described above, the description thereof will not be repeated.

In this embodiment, the radar device 1 generates the radar transmission signal using the code sequence with a predetermined code length Lp. However, the radar device 1 may generate the radar transmission signal using a single pulse, that is, a code with a code length Lp=1. In this case, the radar transmitting unit Tx generates the radar transmission signal using a transmission code of a single pulse $C_1$ with a code length Lp=1.

In the radar receiving unit Rx, the correlation calculation unit 17 calculates correlation using the discrete sample value x(k, M) from the A/D conversion units 15 and 16 and the single pulse $C_1$ with a code length Lp=1 for each transmission period Tr. The correlation calculation unit 17 calculates the correlation value in the M-th transmission period Tr according to Expression (3).

In this embodiment, each vehicle height/speed template correlation calculation unit calculates correlation using the template length corresponding to the vehicle speed $v_q$. In addition, each vehicle height/speed template correlation calculation unit may perform a thinning process or a down sampling process for the template and the output of the adder unit 18 such that the template lengths used by each vehicle height/speed template correlation calculation units are equal to each other and then calculate correlation.

In this embodiment, each vehicle height/speed template correlation calculation unit calculates correlation in the time domain using the template length corresponding to the vehicle speed $v_q$. However, the invention is not limited thereto. For example, each vehicle height/speed template correlation calculation unit may convert the time domain into a frequency domain using a fast Fourier transform process and calculate correlation in the frequency domain. In this case, the same effect as described is obtained.

That is, the vehicle height/speed template correlation calculation unit #p performs an FFT operation with an FFT size N_FFT(#p) which is converted into the frequency domain, using the p-th template $REP_{\#p}[z_u, v_q](n_i)$ and Length($REP_{\#p}$) added correlation values CI(k, m) which are obtained by the adder unit 18 for each discrete time k, and performs a product operation for each of the obtained frequency elements using Expression (16).

[Expression 16]

$$HV\_CI(k, p, m) = \frac{1}{\mathrm{Length}(REP_{\#p}[z_u, v_q])} \times \quad (16)$$
$$IFFT\left[FFT[CI(k, m+1), CI(k, m+\mathrm{Length}(REP_{\#p}[z_u, v_q]))] \otimes \frac{1}{FFT[REP^*_{\#p}[z_u, v_q]]}\right]$$

(where ⊗ indicates a product operation for each frequency element obtained by an FFT operation)

In this case, the FFT size N_FFT(#p) is more than the template length Length($REP_{\#p}$) and data more than the template length Length($REP_{\#p}$) is filled with zero. It is preferable that the FFT size be a power of 2.

Here, IFFT indicates inverse Fourier transform with the FFT size N_FFT(#p). The correlation operation using the frequency domain can reduce a circuit size, as compared to the correlation operation using the time domain.

An FFT operation result of converting the template $REP_{\#p}[z_u, v_q](n_i)$ into the frequency domain may be performed in advance and then stored in the vehicle height/speed template generating unit 19. Since the FFT operation of converting the template into the frequency domain is not needed, it is possible to reduce a circuit size.

The vehicle height/speed template correlation calculation unit #p which performs the correlation operation while synchronizing the discrete time k outputs the correlation value HV_CI(k, p, m) as the result of the correlation operation to the output selection unit 20.

Figure 9:
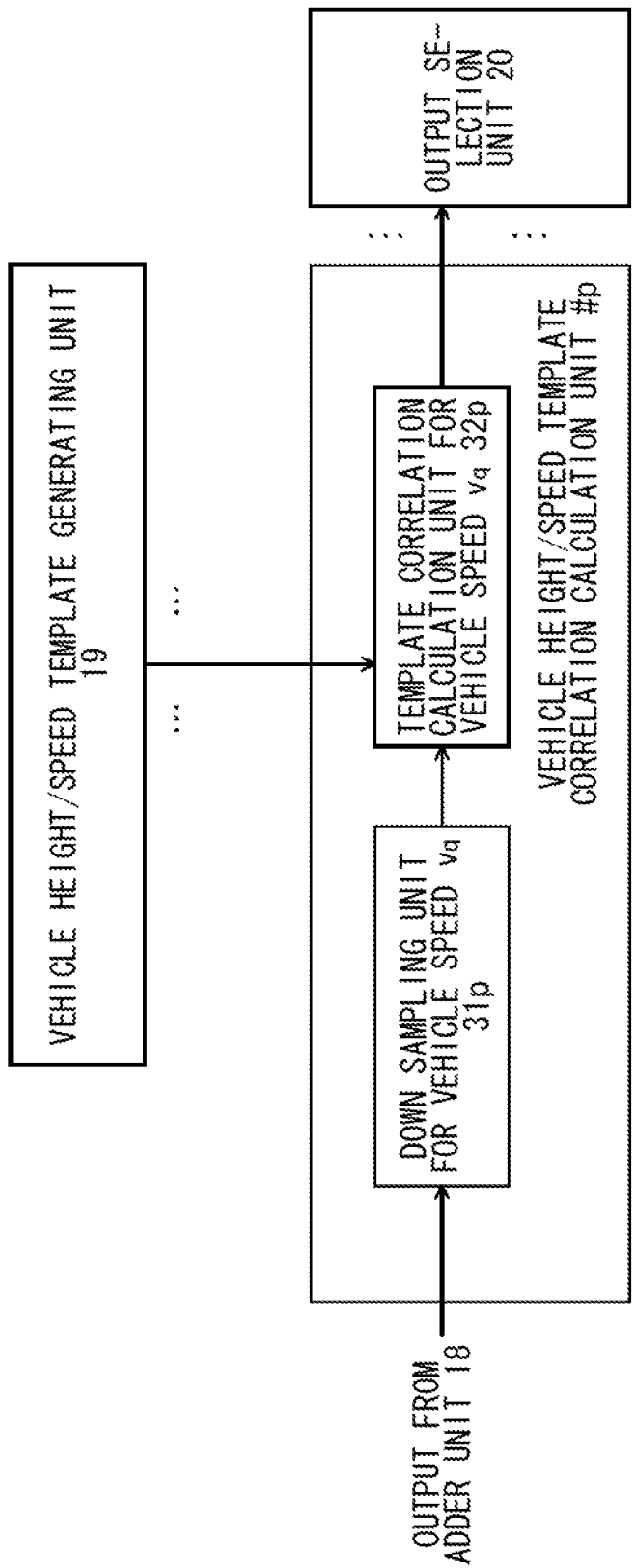
FIG. 9 is a block diagram illustrating the internal structure of a vehicle height/speed template correlation calculation unit according to a modification of the first embodiment.

FIG. 9 is a block diagram illustrating the internal structure of a vehicle height/speed template correlation calculation unit #p according to a modification of the first embodiment. The vehicle height/speed template correlation calculation unit #p includes a down sampling unit 31*p* for a vehicle speed $v_q$ and a template correlation calculation unit 32*p* for a vehicle speed $v_q$.

The down sampling unit 31*p* for a vehicle speed $v_q$ performs a thinning process or a down sampling process for the output CI(k, m) from the adder unit 18 at a predetermined interval $\Delta m(v_q)$. The interval $\Delta m(v_q)$ is represented by Expression (17). In Expression (17), $v_{max}$ is the estimated maximum speed of the vehicle TK. The down sampling unit 31*p* for a vehicle speed $v_q$ outputs the correlation value after the thinning process or the down sampling process to the template correlation calculation unit 32*p* for a vehicle speed $v_q$.

[Expression 17]

$$\Delta m(v_q) = \text{floor}\left[\frac{v_{max}}{v_q}\right] \quad (17)$$

The template correlation calculation unit 32*p* for a vehicle speed $v_q$ calculates correlation according to Expression (18), using the template length Length($REP_{\#p}$) indicating the number of samples of the p-th template $REP_{\#p}[z_u, v_q](n_i)$ and a correlation value obtained by performing a thinning process or a down sampling process for Length($REP_{\#p}$) correlation values obtained by the adder unit 18 for each discrete time k at the interval $\Delta m(v_q)$, while synchronizing the discrete time k. The template correlation calculation unit 32*p* for a vehicle speed $v_q$ outputs a correlation value HV_CI(k, p, m) as the result of the correlation operation to the output selection unit 20.

[Expression 18]

$$HV\_CI(k, p, m) = \frac{1}{\text{floor}\left[\frac{\text{Length}(REP_{\#p}[z_u, v_q])}{\Delta m(v_q)}\right]} \times \sum_{n_i=1}^{\text{Length}(REP_{\#p}[z_u, v_q])} CI(k, m+(n_i-1)\Delta m(v_q)+1) \quad REP_{\#p}^*[z_u, v_q]((n_i-1)\Delta m(v_q)+1) \quad (18)$$

Therefore, as the speed $v_q$ of the vehicle TK is reduced, the thinning interval or the down sampling interval $\Delta m(v_q)$ increases. Therefore, the radar device 1 can reduce the amount of calculation of each vehicle height/speed template correlation calculation unit and a buffer size required for calculation, suppress the deterioration of the accuracy of estimating the height and speed of the vehicle TK, and reduce a circuit size.

Second Embodiment

Radar Device 1A

Figure 10B:
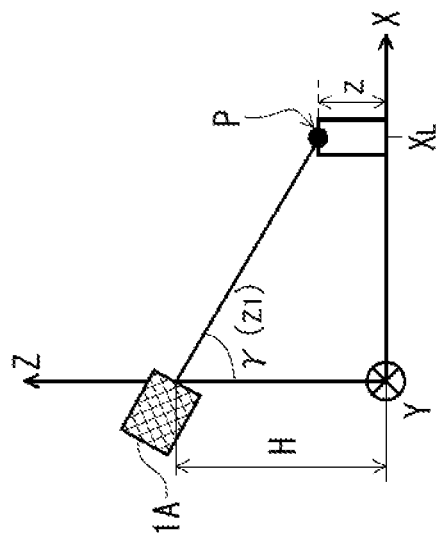
FIG. 10A is a schematic diagram illustrating the arrangement state of a radar device according to a second embodiment on the YZ plane and FIG. 10B is a schematic diagram illustrating the arrangement state of the radar device according to the second embodiment on the XZ plane.
Figure 10A:
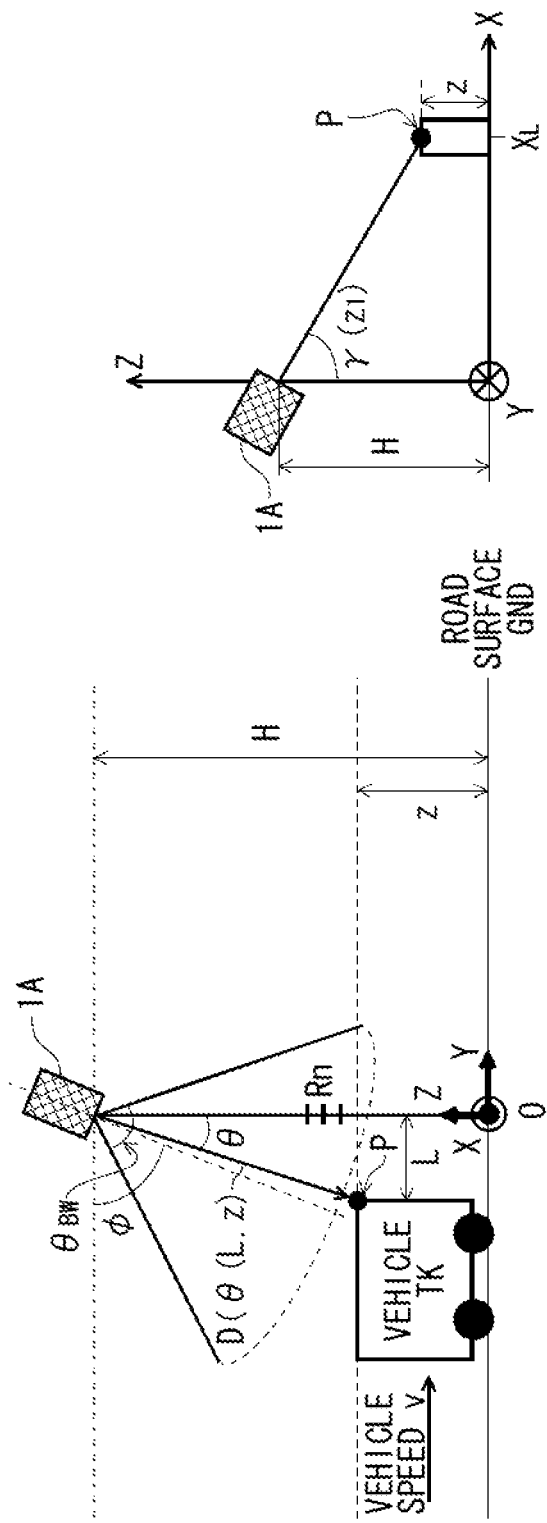

FIG. 10A is a schematic diagram illustrating the arrangement state of a radar device 1A according to a second embodiment on the YZ plane and FIG. 10B is a schematic diagram illustrating the arrangement state of the radar device 1A according to the second embodiment on the XZ plane. In FIGS. 10A and 10B, since the origin and each axis (the X-axis, the Y-axis, and the Z-axis) are the same as those in FIGS. 1A and 1B, the description thereof will not be repeated. A vehicle TK with a height z travels in the +Y-axis direction at a speed v.

In the second embodiment, the radar device 1A is installed at the same place as the radar device 1 according to the first embodiment. However, the depression angle $\phi$ of the radar device 1A is not 90°, unlike the depression angle ($\phi=90°$) of the radar device 1 (see FIG. 10A). Specifically, the depression angle $\phi$ of the radar device 1A is in the direction including a path D(0) immediately below the radar device 1A within a beam width $\theta_{BW}$, that is, a direction including the path of a radar transmission signal when $\theta$ is 0 (see FIG. 10A). Expression (19) is established between the depression angle $\phi$ and the beam width $\theta_{BW}$. The range of $\theta$ included in the beam width $\theta_{BW}$ of the radar device 1A in the direction of the vehicle travel lane is represented by Expression (20). In addition, Expression (20) may be established in the radar device 1 according to the first embodiment.

[Expression 19]

$$\frac{\pi}{2} - 0.5\theta_{BW} \leq \phi \leq \frac{\pi}{2} \quad (19)$$

[Expression 20]

$$-\frac{\theta_{BW}}{2} + \frac{\pi}{2} - \phi \leq \theta \leq \frac{\theta_{BW}}{2} + \frac{\pi}{2} - \phi \quad (20)$$

Therefore, in the second embodiment, a path D(0) (=(H−z)/cos γ(z), see Expression (7)) immediately below the radar device 1A can be associated with a measurement range bin $R_{k(z)}$ (hereinafter, also simply referred to as "$R_k$") at the discrete time k of the radar device 1A. The measurement range bin is the distance from the radar device 1A corresponding to a discrete sample value x(k, M) at the discrete time k. The measurement range bin $R_{k(z)}$ is represented by Expression (21). The discrete time k(z) (hereinafter, also simply referred to as "k") is represented by Expression (22). $\Delta R$ corresponds to a distance per sampling period Trs of the A/D conversion units 15 and 16 and $\Delta R=Trs \times C/2$ is established.

[Expression 21]

$$R_{k(z)} = \Delta R \times (k(z) - 1) \quad (21)$$

[Expression 22]

$$k(z) = \text{floor}\left[\frac{(H-z)}{\Delta R \cos\gamma(z)}\right] + 1 \quad (22)$$

In addition, since the measurement range bin $R_k$ at the discrete time (sample timing) k in the radar receiving unit Rx includes a reflected wave signal from the vehicle TK in a distance range Range(k), Expression (23) is established. Therefore, the radar device 1A performs a correlation operation for the output of the adder unit 18 using the template of the vehicle height $z_u$ satisfying Expression (24).

[Expression 23]

$$\Delta R \times (k-1) \le \text{Range}(k) \le \Delta R \times k \quad (23)$$

[Expression 24]

$$\Delta R \times (k(z)-1) \le \frac{H-z}{\cos\gamma(z)} \le \Delta R \times k(z) \quad (24)$$

Figure 11:
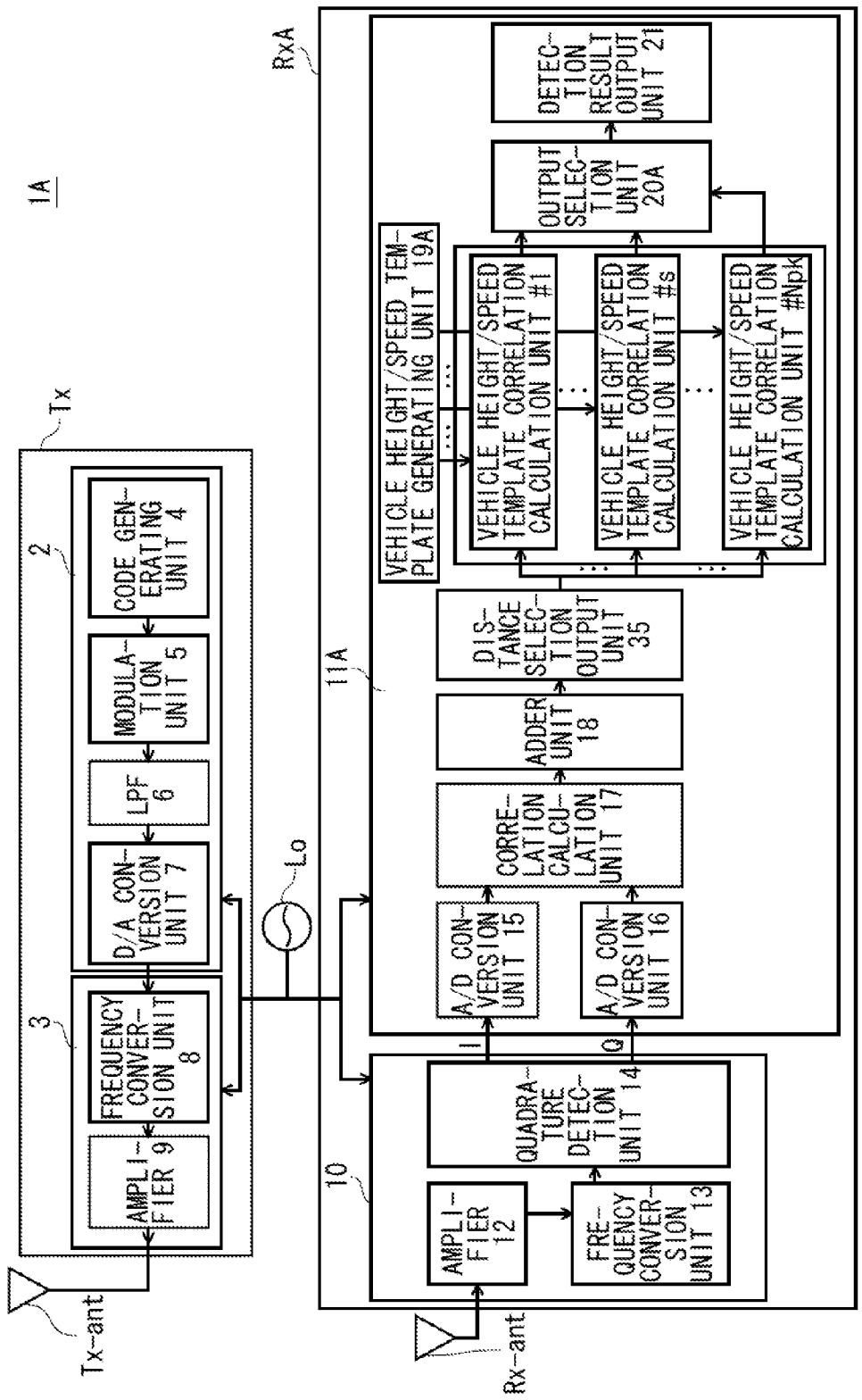
FIG. 11 is a block diagram illustrating in detail the internal structure of the radar device according to the second embodiment.

FIG. 11 is a block diagram illustrating the internal structure of the radar device 1A according to the second embodiment. In the second embodiment, content different from that in the first embodiment will be described and the description of the same content as that in the first embodiment will not be repeated. The radar device 1A includes a reference signal oscillator Lo, a radar transmitting unit Tx, and a radar receiving unit RxA.

The radar receiving unit RxA includes a reception RF unit 10 to which a reception antenna Rx-ant is connected and a signal processing unit 11A. The signal processing unit 11A includes A/D conversion units 15 and 16, a correlation calculation unit 17, an adder unit 18, a distance selection output unit 35, a vehicle height/speed template generating unit 19A, a total of Npk vehicle height/speed template correlation calculation units #s (s is a natural number in the range of 1 to Npk and s<p is satisfied), an output selection unit 20A, and a detection result output unit 21.

The vehicle height/speed template generating unit 19A generates a variation in the phase of the reflected wave signal corresponding to a combination of a vehicle height $z_{u(k)}$ satisfying Expression (24) and a vehicle speed $v_q$ in a predetermined vehicle speed detection range as a template $REP_{\#s(k)}[z_{u(k)}, v_q](n_i)$ according to Expression (25). In Expression (25), #s(k) indicates the ordinal number of combinations of parameter sets of a total of Npk (Npk<Nrep) vehicle heights $z_{u(k)}$ and vehicle speeds $v_q$ and s is a natural number in the range of 1 to Npk. In addition, u(k)×q=Npk is established among u(k), q, and Npk which are natural numbers.

[Expression 25]

$$REP_{\#s(k)}[z_{u(k)}, v_q](n_i) = \exp\left(j\frac{4\pi D(\theta(L_{min} + v_q \times Trs \times n_i, z_{u(k)}))}{\lambda}\right) \quad (25)$$

When the range of the vehicle height $z_{u(k)}$ satisfying Expression (24) is not included in a predetermined range [zmin, zmax] of the height of the vehicle TK estimated by the radar device 1A for the measurement range bin $R_{k(z)}$ at the discrete time k(z), the vehicle height/speed template generating unit 19A does not generate a template and #s(k) is 0.

The vehicle height/speed template generating unit 19A may generate a template according to Expression (25), using the range of the vehicle height $z_{u(k)}$ which satisfies Expression (24) and in which a path $D(-\theta_{BW}/2+\pi/2-\phi)$ and a path $D(\theta_{BW}/2+\pi/2-\phi)$ in the range of $\theta$ in Expression (20) are not included in ranges Range(k−1) and Range(k+1) before and after Range (k).

In this way, a peak correlation value, which is the result of the correlation operation by each vehicle height/speed template correlation calculation unit, is not laid across a plurality of measurement range bins. Therefore, the number of templates used in the correlation operation is reduced and the amount of throughput of the signal processing unit 11A is reduced.

The distance selection output unit 35 performs the following process on the basis of the added correlation value CI(k, m) output from the adder unit 18. Specifically, when the range of the vehicle height $z_{u(k)}$ satisfying Expression (24) is not included in [zmin, zmax] for the measurement range bin $R_{k(z)}$ at the discrete time k(z), that is, when #s(k) is 0, the distance selection output unit 35 ignores the output of the adder unit 18. Alternatively, the correlation calculation unit 17 or the adder unit 18 may exclude the calculation results of the correlation calculation unit 17 and the adder unit 18 at the discrete time k at which #s(k) is 0 in advance. In this case, the amount of throughput of the distance selection output unit 35 is reduced.

When the range of the vehicle height $z_{u(k)}$ satisfying Expression (24) is included in [zmin, zmax] for the measurement range bin $R_{k(z)}$ at the discrete time k, that is, when #s(k)>0 is satisfied, the distance selection output unit 35 outputs the added correlation value CI(k, m) output from the adder unit 18 to the vehicle height/speed template correlation calculation unit #s corresponding to the template $REP_{\#s}[z_{u(k)}, v_q](n_i)$ in the measurement range bin $R_{k(z)}$ at the discrete time k(z). In addition, Npk corresponds to the number of discrete times k at which #s(k)>0 is satisfied.

Since the vehicle height/speed template correlation calculation units #1 to #Npk have the same operation, the vehicle height/speed template correlation calculation unit #s will be described as an example. The vehicle height/speed template correlation calculation unit #s calculates correlation on the basis of the template $REP_{\#s(ks)}[z_{u(k)}, v_q](n_i)$ corresponding to a measurement range bin $R_{ks}$ at a discrete time $k_s$ and the output (CI($k_s$, m)) of the distance selection output unit 35.

Specifically, the vehicle height/speed template correlation calculation unit #s calculates correlation according to Expression (26), using a template length Length($REP_{\#s(ks)}$) (see Expression (11)) indicating the number of samples of an s-th template $REP_{\#s(ks)}[z_{u(k)}, v_q](n_i)$ and Length($REP_{\#s(ks)}$) added correlation values CI($k_s$, m) which are obtained by the distance selection output unit 35 for each discrete time k, while synchronizing the discrete time $k_s$. The vehicle height/speed template correlation calculation unit #s outputs a correlation value HV_CI($k_s$, s($k_s$), m) as the result of the correlation operation to the output selection unit 20A.

[Expression 26]

$$HV\_CI(k_s, s(k_s), m) = \frac{1}{\text{Length}(REP_{\#s(k_s)}[z_u, v_q])} \sum_{n_i=1}^{\text{Length}(REP_{\#s(k_s)}[z_u, v_q])} CI(k_s, m+n_i) REP^*_{\#s(k_s)}[z_u, v_q](n_i) \quad (26)$$

The output selection unit 20A determines whether there is a correlation value $HV\_CI(k_s, s(k_s), m)$ greater than a predetermined threshold value TH_Level on the basis of the correlation values $HV\_CI(k_s, s(k_s), m)$ from a total of Nrep vehicle height/speed template correlation calculation units #1 to #Npk. When it is determined that there is a correlation value greater than the predetermined threshold value TH_Level, that is, when Expression (27) is established, the output selection unit 20A determines that the vehicle TK passes within the beam width $\theta_{BW}$ of the radar device 1A and counts the number of passages of the vehicle TK for a vehicle flow rate. In Expression (27), $s_{sel}$ indicates the ordinal number of the template when Expression (27) is established.

[Expression 27]

$$HV\_CI(k_s, s_{sel}, m) > \text{TH\_Level} \quad (27)$$

The output selection unit 20A selects the vehicle height $z_{u(k)}$ and the vehicle speed $v_q$ corresponding to the template $REP_{\#ssel}[z_{u(k)}, v_q](n_i)$ as the estimated values of the height and speed of the vehicle TK and determines the type of vehicle. The output selection unit 20A determines whether the vehicle is a large vehicle or a small vehicle as the type of vehicle on the basis of, for example, the height of the vehicle. The output selection unit 20A outputs the estimated values of the height and speed of the vehicle and the determination result of the type of vehicle to the detection result output unit 21.

When there are a plurality of outputs of the vehicle height/speed template correlation calculation units satisfying Expression (27), the output selection unit 20A may select the estimated values of the height and speed of the vehicle TK using the maximum value among the plurality of correlation values $HV\_CI(k, s_{sel}, m)$.

Alternatively, the output selection unit 20A may perform an interpolation process using each of the plurality of correlation values of the vehicle height/speed template correlation calculation units satisfying Expression (27) to select the estimated values of the height and speed of the vehicle TK. In this case, the radar device 1A can improve the accuracy of estimating the height and speed of the vehicle TK and reduce a circuit size, without increasing the number of templates.

In this embodiment, each vehicle height/speed template correlation calculation unit calculates correlation using the template length corresponding to the vehicle speed $v_q$. In addition, each vehicle height/speed template correlation calculation unit may perform a thinning process or a down sampling process for the template and the output of the adder unit 18 such that the template lengths used by each vehicle height/speed template correlation calculation units are equal to each other and then calculate correlation.

Figure 12:
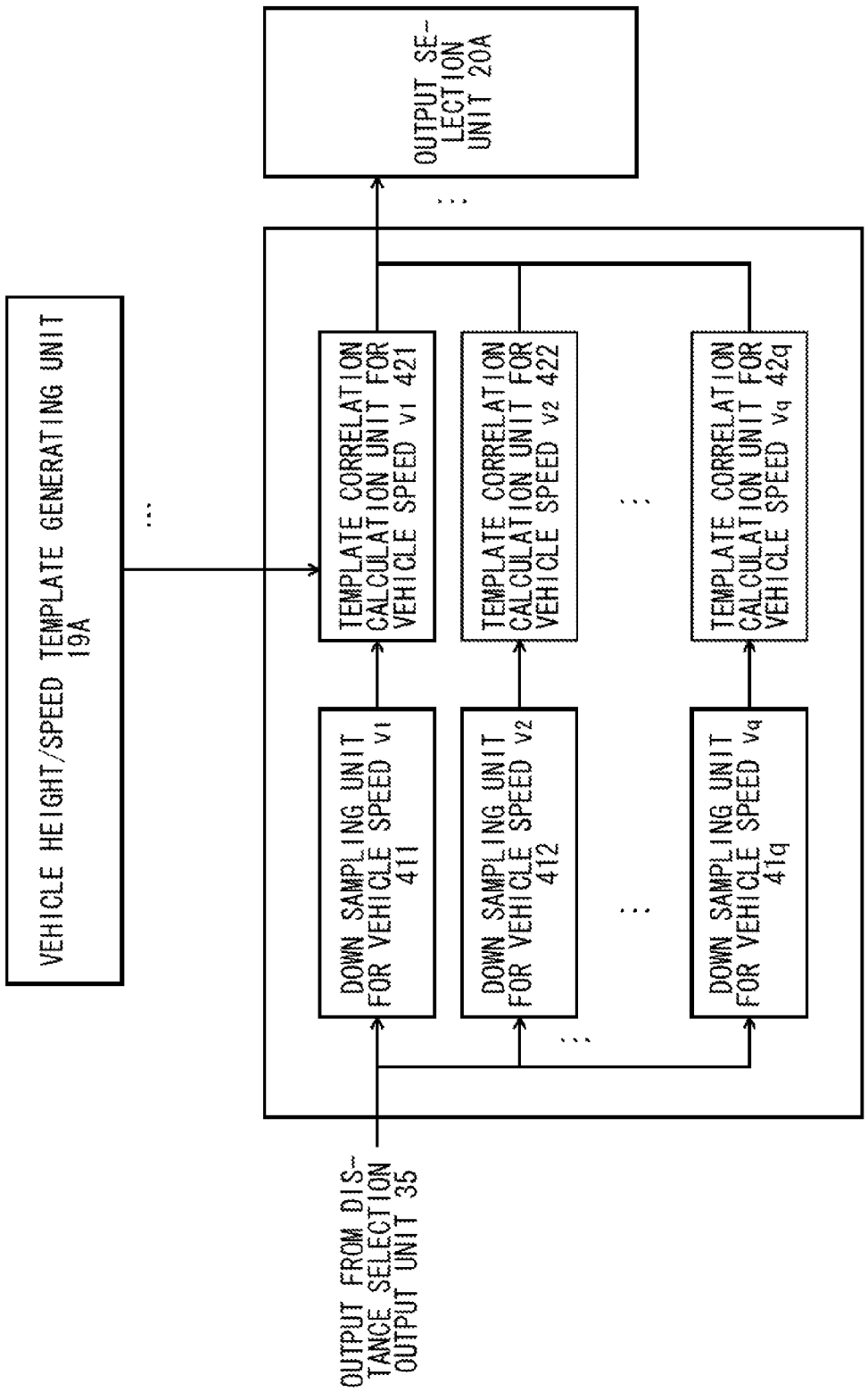
FIG. 12 is a block diagram illustrating the internal structure of a vehicle height/speed template correlation calculation unit according to a modification of the second embodiment.

FIG. 12 is a block diagram illustrating the internal structure of a vehicle height/speed template correlation calculation unit #s according to a modification of the second embodiment. The vehicle height/speed template correlation calculation unit #s includes a down sampling unit 411 for a vehicle speed $v_1$, a down sampling unit 412 for a vehicle speed $v_2$, . . . , a down sampling unit 41q for a vehicle speed $v_q$, a template correlation calculation unit 421 for a vehicle speed $v_1$, a template correlation calculation unit 422 for a vehicle speed $v_2$, . . . , and a template correlation calculation unit 42q for a vehicle speed $v_q$.

Each vehicle height/speed template correlation calculation unit #s operates as follows using $s(k_s)$ templates $REP_{\#s(k)}[z_{u(k)}, v_q](n_i)$ in the measurement range bin $R_{k(z)}$ corresponding to the discrete time $k_s$. In one vehicle height/speed template correlation calculation unit, since the down sampling units and the template correlation calculation units have the same operation, the operation of the down sampling unit 41q for a vehicle speed $v_q$ and the template correlation calculation unit 42q for a vehicle speed $v_q$ will be described as an example.

The down sampling unit 41q for a vehicle speed $v_q$ performs a thinning process or a down sampling process for the output $CI(k, m)$ from the distance selection output unit 35 at a predetermined interval $\Delta m(v_q)$. The interval $\Delta m(v_q)$ is represented by Expression (17). In Expression (17), $v_{max}$ is the estimated maximum speed of the vehicle TK. The down sampling unit 31p for a vehicle speed $v_q$ outputs the correlation value after the thinning process or the down sampling process to the template correlation calculation unit 42q for a vehicle speed $v_q$.

The template correlation calculation unit 42q for a vehicle speed $v_q$ calculates correlation according to Expression (28), using a template length $\text{Length}(REP_{\#s(ks)})$ indicating the number of samples of an $s(k_s)$-th template $REP_{\#s(ks)}[z_u, v_q](n_i)$ and a correlation value obtained by performing a thinning process or a down sampling process for $\text{Length}(REP_{\#s(ks)})$ correlation values which are obtained by the distance selection output unit 35 for each discrete time k at the interval $\Delta m(v_q)$, while synchronizing the discrete time $k_s$. The template correlation calculation unit 42p for a vehicle speed $v_q$ outputs a correlation value $HV\_CI(k_s, s(k_s), m)$ as the result of the correlation operation to the output selection unit 20A.

[Expression 28]

$$HV\_CI(k_s, s(k_s), m) = \frac{1}{\text{floor}\left[\frac{\text{Length}(REP_{\#s(k_s)}[z_u, v_q])}{\Delta m(v_q)}\right]} \times \sum_{n_i=1}^{\text{Length}(REP_{\#s(k_s)}[z_u, v_q])} CI(k_s, m + (n_i-1)\Delta m(v_q) + 1)$$

$$REP^*_{\#s(k_s)}[z_u, v_q](m + (n_i-1)\Delta m(v_q) + 1) \quad (28)$$

Therefore, as the speed $v_q$ of the vehicle TK is reduced, the thinning interval or the down sampling interval $\Delta m(v_q)$ increases. Therefore, the radar device 1A can reduce the amount of calculation of each vehicle height/speed template correlation calculation unit and a buffer size required for calculation, suppress the deterioration of the accuracy of estimating the height and speed of the vehicle TK, and reduce a circuit size.

Third Embodiment

Radar Device 1B

Figure 13:
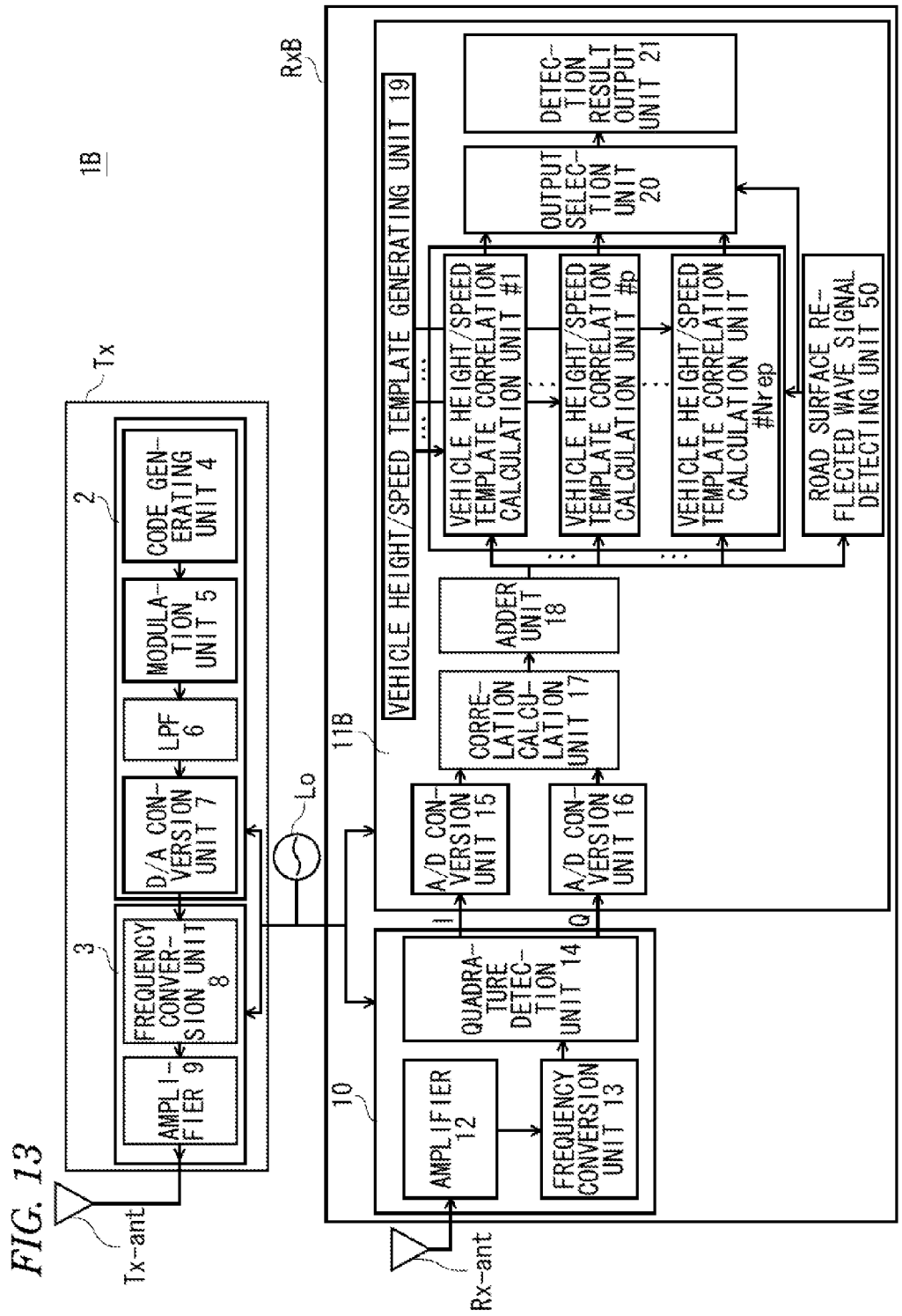
FIG. 13 is a block diagram illustrating in detail the internal structure of a radar device according to a third embodiment.

In a third embodiment, a road surface reflected wave signal detecting unit 50 is further provided in the radar receiving unit Rx of the radar device 1 according to the first embodiment (see FIG. 13). In the third embodiment, Expression (20) is also established. When a vehicle TK travels in the +Y direction, θ at which the vehicle TK is detected earliest in the range of θ included in a beam width $\theta_{BW}$ is represented by Expression (29).

[Expression 29]

$$\theta = -\frac{\theta_{BW}}{2} + \frac{\pi}{2} - \phi \qquad (29)$$

A distance Droad from a radar device 1B to a road surface GND in the direction of θ represented by Expression (29) is represented by Expression (30). Therefore, when a radar receiving unit RxB detects the intensity level of a road surface reflected wave signal at a discrete time $k_{Droad}$ (=floor[Droad/ΔR]+1), the radar device 1B can detect the time when the vehicle TK enters an area of a vehicle travel lane corresponding to the beam width $\theta_{BW}$ of the radar device 1B.

[Expression 30]

$$\text{Droad} = \frac{H}{\cos\left(-\frac{\theta_{BW}}{2} + \frac{\pi}{2} - \phi\right)\cos\gamma(z)} \qquad (30)$$

FIG. 13 is a block diagram illustrating in detail the internal structure of the radar device 1B according to the third embodiment. In the third embodiment, content different from that in the first embodiment will be described and the description of the same content as that in the first embodiment will not be repeated. The radar device 1B includes a reference signal oscillator Lo, a radar transmitting unit Tx, and the radar receiving unit RxB.

The radar receiving unit RxB includes a reception RF unit 10 to which a reception antenna Rx-ant is connected and a signal processing unit 11B. The signal processing unit 11B includes A/D conversion units 15 and 16, a correlation calculation unit 17, an adder unit 18, a vehicle height/speed template generating unit 19, a total of Nrep vehicle height/speed template correlation calculation units #1 to #Nrep (p=1 to Nrep), a road surface reflected wave signal detecting unit 50, an output selection unit 20, and a detection result output unit 21.

The road surface reflected wave signal detecting unit 50 detects the time when the vehicle TK enters the area of the vehicle travel lane corresponding to the beam width $\theta_{BW}$ of the radar device 1B from the output CI(k, m) of the adder unit 18 on the basis of the level of the output CI($k_{Droad}$, m) of the adder unit 18 at a discrete time $k_{Droad}$ when the road surface reflected wave signal is detected.

Specifically, when the level of the output CI($k_{Droad}$, m) of the adder unit 18 at the discrete time $k_{Droad}$ is equal to or higher than a predetermined level TLev_road, the road surface reflected wave signal detecting unit 50 determines that the vehicle TK does not enter the area of the vehicle travel lane corresponding to the beam width $\theta_{BW}$ of the radar device 1B.

When the level of the output CI($k_{Droad}$, m) of the adder unit 18 at the discrete time $k_{Droad}$ is lower than the predetermined level TLev_road, the road surface reflected wave signal detecting unit 50 determines that the vehicle TK starts to enter the area of the vehicle travel lane corresponding to the beam width $\theta_{BW}$ of the radar device 1B. In addition, the road surface reflected wave signal detecting unit 50 outputs the output time of the output CI(k, $m_{start}$) from the adder unit 18 at an entrance start time as a start trigger signal to each vehicle height/speed template correlation calculation unit #p. That is, m is fixed to a start position and is calculated as $m_{start}$.

In addition, when the level of the output CI($k_{Droad}$, m) of the adder unit 18 at the discrete time $k_{Droad}$ is higher than the predetermined level TLev_road after the start trigger signal is output, the road surface reflected wave signal detecting unit 50 determines that the entrance of the vehicle TK to the area of the vehicle travel lane corresponding to the beam width $\theta_{BW}$ of the radar device 1B has ended. The road surface reflected wave signal detecting unit 50 outputs the output time of the output CI(k, $m_{start}$) from the adder unit 18 at an entrance end time as an end trigger signal to each vehicle height/speed template correlation calculation unit #p.

The vehicle height/speed template correlation calculation unit #p calculates correlation according to Expression (31) on the basis of the start trigger signal from the road surface reflected wave signal detecting unit 50, using a template length Length($REP_{\#p}$) indicating the number of samples of a p-th template $REP_{\#p}[z_u, v_q](n_i)$ and Length($REP_{\#p}$) correlation values after CI(k, $m_{start}$) which are obtained by the adder unit 18 for each discrete time k, while synchronizing the discrete time k. Here, $m_{start}$ is a fixed value.

[Expression 31]

$$\text{HV\_CI}(k, p) = \frac{1}{\text{Length}(REP_{\#p}[z_u, v_q])} \sum_{n_i=1}^{Length(REP_{\#p}[z_u,v_q])} CI(k, m_{start} + n_i) REP_{\#p}^*[z_u, v_q](n_i) \qquad (31)$$

The output selection unit 20 performs the following operation using the correlation value which is output from the output time of the start trigger signal to the output time of the end trigger signal from the road surface reflected wave signal detecting unit 50, among the correlation values HV_CI(k, p) from a total of Nrep vehicle height/speed template correlation calculation units #p (p is a natural number in the range of 1 to Nrep). That is, the output selection unit 20 determines whether there is a correlation value HV_CI(k, p) greater than a predetermined threshold value TH_Level.

When it is determined that there is a correlation value HV_CI(k, p) greater than the predetermined threshold value TH_Level, that is, when Expression (13) is established, the output selection unit 20 determines that the vehicle TK passes within the beam width $\theta_{BW}$ of the radar device 1B and counts the number of passages of the vehicle TK for a vehicle flow rate. In Expression (13), $P_{sel}$ indicates the ordinal number of the template in which Expression (13) is established.

When there are a plurality of outputs of the vehicle height/speed template correlation calculation units satisfying Expression (13), the output selection unit 20 may select the estimated values of the height and speed of the vehicle TK using the maximum value of the plurality of correlation values HV_CI(k, $p_{sel}$).

Alternatively, the output selection unit 20 may perform an interpolation process using each of the plurality of correlation values of the vehicle height/speed template correlation calculation units satisfying Expression (13) to select the estimated values of the height and speed of the vehicle TK. In this case, the radar device 1B can improve the accuracy of estimating the height and speed of the vehicle TK and reduce a circuit size, without increasing the number of templates.

The output selection unit 20 selects the vehicle height $z_u$ and the vehicle speed $v_q$ corresponding to the template $REP_{\#psel}[z_u, v_q](n_i)$ as the estimated values of the height and speed of the vehicle TK and determines the type of vehicle. The output selection unit 20 determines whether the vehicle is a large vehicle or a small vehicle as the type of vehicle on the basis of, for example, the height of the vehicle. The output selection unit 20 outputs the estimated values of the height and speed of the vehicle and the determination result of the type of vehicle to the detection result output unit 21.

In this way, the radar device 1B can detect the start time of the correlation operation using the template on the basis of whether there is a road surface reflected wave signal when the vehicle TK does not travel along the vehicle travel lane and set the period for which the road surface reflected wave signal is not detected as a correlation operation period using the template. Therefore, the radar device 1B can simplify the circuit structure of the vehicle height/speed template correlation calculation unit, without using a sliding correlation operation. The sliding correlation operation requires a FIR filter with a template length, that is, registers and multipliers corresponding to a template size. However, the radar device 1B can calculate correlation using registers and multipliers corresponding to the reciprocal of the template size.

The radar device 1B can detect the start time of the correlation operation using the template. Therefore, the operation of the vehicle height/speed template correlation calculation unit is not needed for the period for which the vehicle TK is absent and it is possible to reduce the power consumption of the radar receiving unit RxB.

The output selection unit 20 may determine the type of vehicle using the following method, instead of selecting the vehicle height z and the vehicle speed $v_q$ corresponding to the template $REP_{\#psel}[z_u, v_q](n_i)$ as the estimated values of the height and speed of the vehicle TK.

That is, the output selection unit 20 estimates the length $L_{car}$ of the vehicle which passes within the beam width $\theta_{BW}$ of the radar device 1B using Expression (32), on the basis of the vehicle speed $v_q$ [m/s], which is the estimated value of the vehicle speed corresponding to the template $REP_{\#psel}[z_u, v_q](n_i)$, and a time interval $(T_{end}-T_{start})$ from the output time $T_{start}$ of the start trigger signal to the output time $T_{end}$ of the end trigger signal and determines type of vehicle using the estimated value of the length of the vehicle.

The output selection unit 20 determines whether the vehicle is a large vehicle or a small vehicle as the type of vehicle on the basis of, for example, the length of the vehicle. The output selection unit 20 outputs the estimated values of the length and speed of the vehicle and the determination result of the type of vehicle to the detection result output unit 21.

[Expression 32]

$$L_{car}=(T_{end}-T_{start}) \times v_q \quad (32)$$

The output selection unit 20 may determine the type of vehicle using the estimation result of the height of the vehicle, in addition to the estimation of the length of the vehicle. In this case, since two estimated values, that is, the estimated values of the height and length of the vehicle are used, it is possible to improve the accuracy of the output selection unit 20 determining the type of vehicle.

Fourth Embodiment

Radar Device 1C

Figure 14:
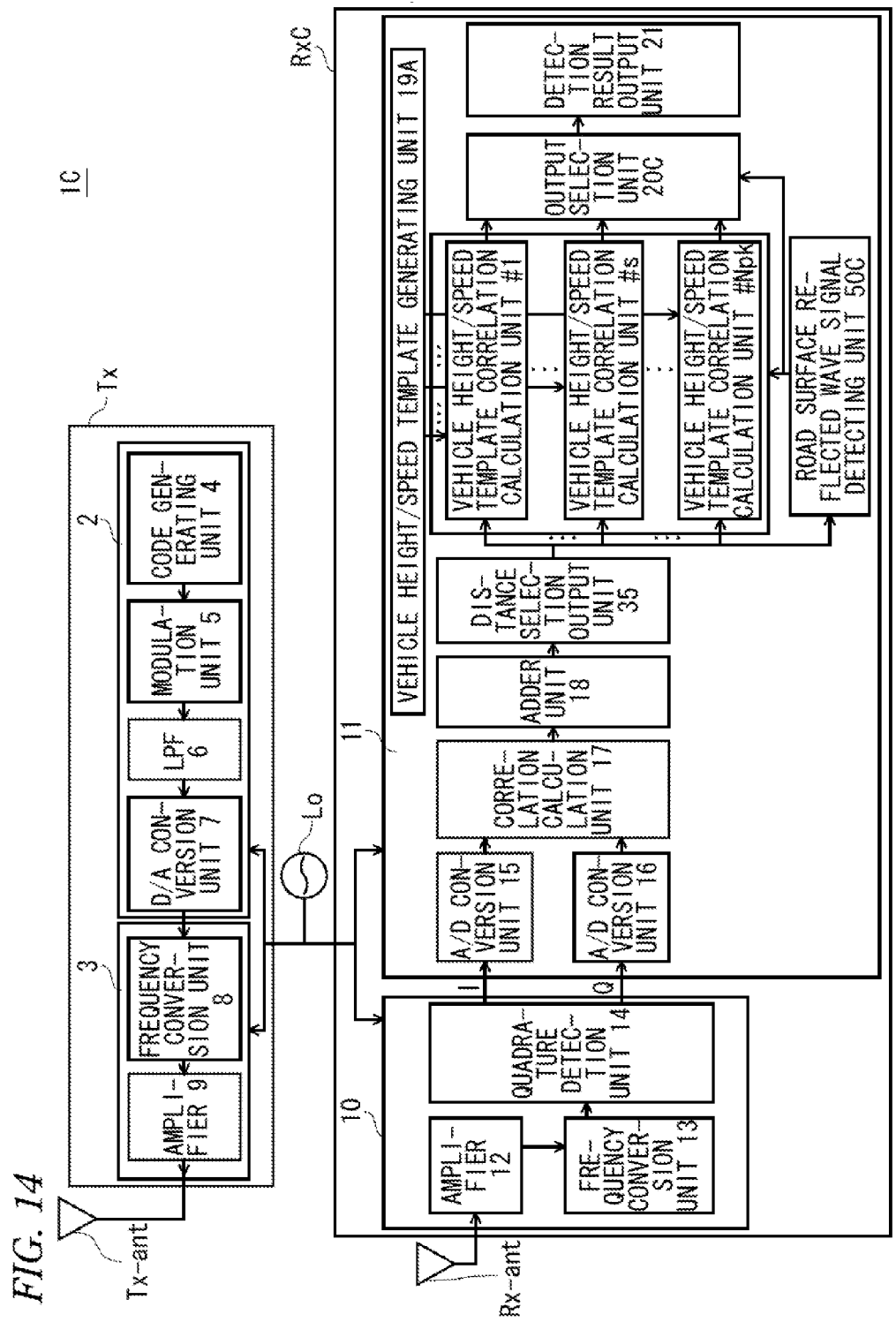
FIG. 14 is a block diagram illustrating in detail the internal structure of a radar device according to a fourth embodiment.

In a fourth embodiment, a road surface reflected wave signal detecting unit 50C is further provided in the radar receiving unit RxA of the radar device 1A according to the second embodiment (see FIG. 14). FIG. 14 is a block diagram illustrating in detail the internal structure of a radar device 1C according to the fourth embodiment. In the fourth embodiment, content different from that in the second or third embodiment will be described and the description of the same content as that in the second or third embodiment will not be repeated. The radar device 1C includes a reference signal oscillator Lo, a radar transmitting unit Tx, and a radar receiving unit RxC.

The radar receiving unit RxC includes a reception RF unit 10 to which a reception antenna Rx-ant is connected and a signal processing unit 11C. The signal processing unit 11C includes A/D conversion units 15 and 16, a correlation calculation unit 17, an adder unit 18, a distance selection output unit 35, a vehicle height/speed template generating unit 19A, a total of Npk vehicle height/speed template correlation calculation units #1 to #Npk (s=1 to Npk), a road surface reflected wave signal detecting unit 500, an output selection unit 20C, and a detection result output unit 21.

The road surface reflected wave signal detecting unit 50C detects the time when the vehicle TK enters an area of a vehicle travel lane corresponding to the beam width $\theta_{BW}$ of the radar device 1C from the output CI(k, m) of the distance selection output unit 35 on the basis of the level of the output $CI(k_{Droad}, m)$ of the distance selection output unit 35 at a discrete time $k_{Droad}$ when a road surface reflected wave signal is detected.

Specifically, when the level of the output $CI(k_{Droad}, m)$ of the distance selection output unit 35 at the discrete time $k_{Droad}$ is equal to or higher than a predetermined level TLev_road, the road surface reflected wave signal detecting unit 50C determines that the vehicle TK does not enter the area of the vehicle travel lane corresponding to the beam width $\theta_{BW}$ of the radar device 1B.

When the level of the output $CI(k_{Droad}, m)$ of the distance selection output unit 35 at the discrete time $k_{Droad}$ is lower than the predetermined level TLev_road, the road surface reflected wave signal detecting unit 50C determines that the vehicle TK starts to enter the area of the vehicle travel lane corresponding to the beam width $\theta_{BW}$ of the radar device 1C. In addition, the road surface reflected wave signal detecting unit 50C outputs the output time of the output $CI(k, m_{start})$ from the distance selection output unit 35 at an entrance start time as a start trigger signal to each vehicle height/speed template correlation calculation unit #s. That is, CI is calculated using m as a fixed value.

In addition, when the level of the output $CI(k_{Droad}, m)$ of the adder unit 18 at the discrete time $k_{Droad}$ is higher than the predetermined level TLev_road after the start trigger signal is output, the road surface reflected wave signal detecting unit 50C determines that the vehicle TK has entered the area of the vehicle travel lane corresponding to the beam width $\theta_{BW}$ of the radar device 1C. The road surface reflected wave signal detecting unit 50C outputs the output time of the output CI(k, $m_{start}$) from the adder unit 18 at an entrance end time as an end trigger signal to each vehicle height/speed template correlation calculation unit #s.

The vehicle height/speed template correlation calculation unit #s calculates correlation according to Expression (33) on the basis of the start trigger signal from the road surface reflected wave signal detecting unit 50C, using a template length Length($REP_{\#s(ks)}$) indicating the number of samples of an s-th template $REP_{\#s(ks)}[z_u, v_q](n_i)$ and Length($REP_{\#s(ks)}$) added correlation values after CI($k_s$, $m_{start}$) which are obtained by the distance selection output unit 35 for each discrete time $k_s$, while synchronizing the discrete time k. Here, $m_{start}$ is a fixed value.

[Expression 33]

$$HV\_CI(k, p) = \frac{1}{\text{Length}(REP_{\#s(k_s)}[z_u, v_q])} \sum_{n_i=1}^{\text{Length}(REP_{\#s(k_s)}[z_u, v_q])} CI(k_s, m_{start} + n_i) REP^*_{\#s(k_s)}[z_u, v_q](n_i) \quad (33)$$

The output selection unit 20C performs the following operation, using the correlation value which is output from the output time of the start trigger signal to the output time of the end trigger signal from the road surface reflected wave signal detecting unit 50C among the correlation values HV_CI(k, p) from a total of Nrep vehicle height/speed template correlation calculation units #1 to #N rep.

That is, the output selection unit 20C determines whether there is a correlation value HV_CI(k, p) greater than a predetermined threshold value TH_Level. When it is determined that there is a correlation value HV_CI(k, p) greater than the predetermined threshold value TH_Level, that is, when Expression (13) is established, the output selection unit 20C determines that the vehicle TK passes within the beam width $\theta_{BW}$ of the radar device 1 and counts the number of passages of the vehicle TK for a vehicle flow rate. In Expression (13), $P_{sel}$ indicates the ordinal number of the template in which Expression (13) is established.

When there are a plurality of outputs of the vehicle height/speed template correlation calculation units satisfying Expression (13), the output selection unit 20C may select the estimated values of the height and speed of the vehicle TK using the maximum value of the plurality of correlation values HV_CI(k, $p_{sel}$).

Alternatively, the output selection unit 20 may perform an interpolation process using each of the plurality of correlation values of the vehicle height/speed template correlation calculation units satisfying Expression (13) to select the estimated values of the height and speed of the vehicle TK. In this case, the radar device 1 can improve the accuracy of estimating the height and speed of the vehicle TK and reduce a circuit size, without increasing the number of templates.

The output selection unit 20C selects the vehicle height $z_u$ and the vehicle speed $v_q$ corresponding to the template $REP_{\#psel}[z_u, v_q](n_i)$ as the estimated values of the height and speed of the vehicle TK and determines the type of vehicle. The output selection unit 20C determines whether the vehicle is a large vehicle or a small vehicle as the type of vehicle on the basis of, for example, the height of the vehicle. The output selection unit 20 outputs the estimated values of the height and speed of the vehicle and the determination result of the type of vehicle to the detection result output unit 21.

In this way, the radar device 1C can detect the start time of the correlation operation using the template on the basis of whether there is a road surface reflected wave signal when the vehicle TK does not travel along the vehicle travel lane and set the period for which the road surface reflected wave signal is not detected as a correlation operation period using the template.

Therefore, the radar device 1C can simplify the circuit structure of the vehicle height/speed template correlation calculation unit, without using a sliding correlation operation. The sliding correlation operation requires a FIR filter with a template length, that is, registers and multipliers corresponding to a template size. However, the radar device 1B can calculate correlation using registers and multipliers corresponding to the reciprocal of the template size.

The radar device 1C can detect the start time of the correlation operation using the template. Therefore, the operation of the vehicle height/speed template correlation calculation unit is not needed for the period for which the vehicle TK is absent and it is possible to reduce the power consumption of the radar receiving unit RxC.

The output selection unit 20C may determine the type of vehicle using the following method, instead of selecting the vehicle height $z_u$ and the vehicle speed $v_q$ corresponding to the template $REP_{\#psel}[z_u, v_q](n_i)$ as the estimated values of the height and speed of the vehicle TK.

The output selection unit 200 estimates the length $L_{car}$ of the vehicle which passes within the beam width $\theta_{BW}$ of the radar device 1C using Expression (32), on the basis of the vehicle speed $v_q$ [m/s], which is the estimated value of the vehicle speed corresponding to the template $REP_{\#psel}[z_u, v_q](n_i)$, and the time interval $(T_{end}-T_{start})$ from the output time $T_{start}$ of the start trigger signal to the output time $T_{end}$ of the end trigger signal, and determines type of vehicle using the estimated value of the length of the vehicle.

The output selection unit 20C determines whether the vehicle is a large vehicle or a small vehicle as the type of vehicle on the basis of, for example, the length of the vehicle. The output selection unit 20 outputs the estimated values of the length and speed of the vehicle and the determination result of the type of vehicle to the detection result output unit 21.

The output selection unit 20C may determine the type of vehicle using the estimation result of the height of the vehicle, in addition to the estimation of the length of the vehicle. In this case, since two estimated values, that is, the estimated values of the height and length of the vehicle are used, it is possible to improve the accuracy of the output selection unit 20C determining the type of vehicle.

Fifth Embodiment

Radar Device 1D

In each of the above-described embodiments, the number of lanes along which the vehicle, which is a detection target of the radar device, travels is one. In a fifth embodiment, the number of lanes along which the vehicle, which is a detection target of a radar device 1D, travels is two or more (for example, two). In the radar device 1D, the vehicle height/speed template generating unit and a set of the vehicle height/speed template correlation calculation units according to each of the above-described embodiments are installed for each lane along which the vehicle, which is a detection target, travels. Therefore, the radar device 1D can detect the vehicles from a plurality of vehicle travel lanes.

Figure 15A:
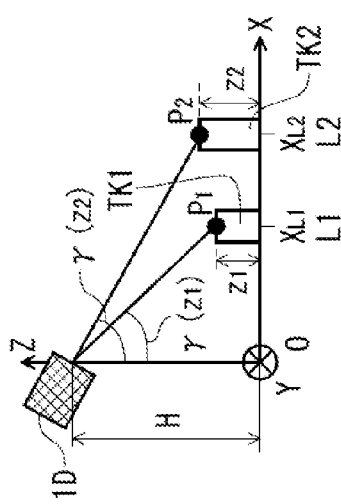
FIG. 15A is a schematic diagram illustrating the arrangement state of a radar device according to a fifth embodiment relative to a plurality of vehicle travel lanes on the XZ plane and FIG. 15B is a block diagram illustrating in detail the internal structure of a signal processing unit of the radar device according to the fifth embodiment.
Figure 15B:
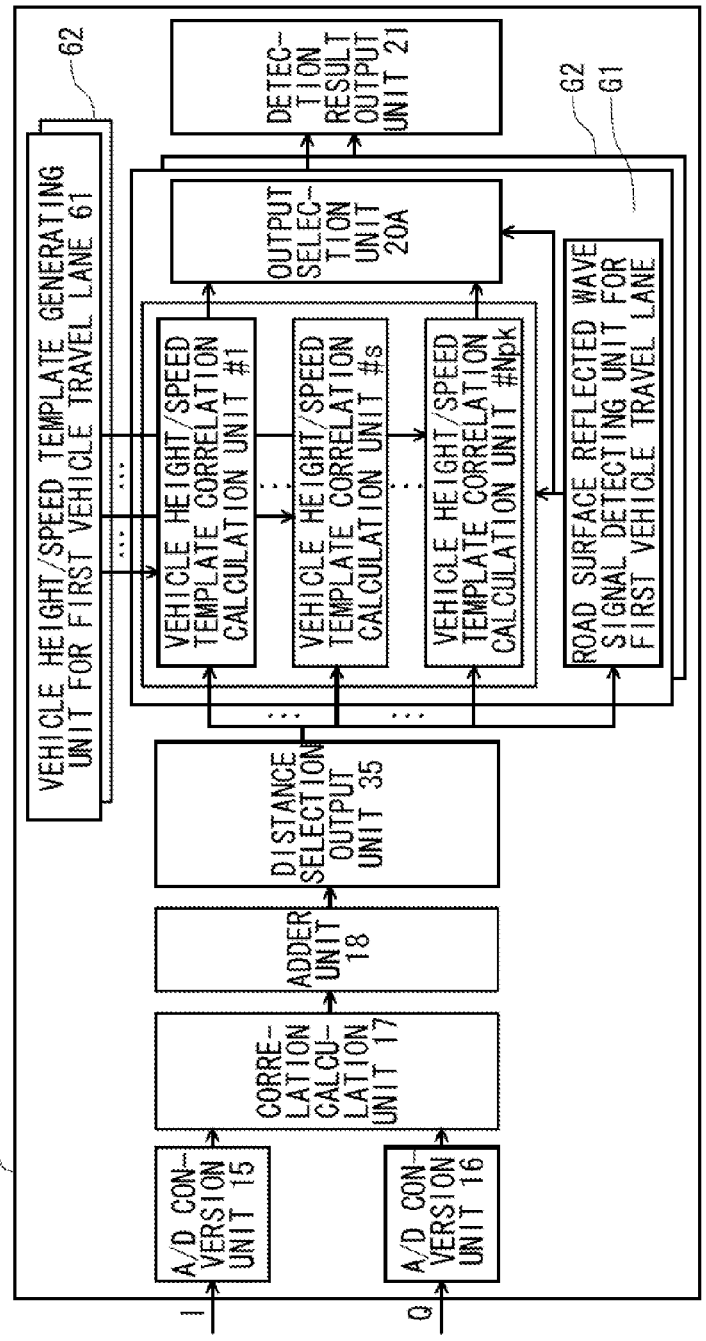

FIG. 15A is a schematic diagram illustrating the arrangement state of the radar device 1D according to the fifth embodiment relative to a plurality of vehicle travel lanes on the XZ plane and FIG. 15B is a block diagram illustrating in detail the internal structure of a signal processing unit 11D of the radar device according to the fifth embodiment. In FIG. 15A, the origin and each axis (the X-axis, the Y-axis, and the Z-axis) are the same as those in FIG. 1A and the description thereof will not be repeated.

In FIG. 15A, a first vehicle travel lane $X_{L1}$ is closer to the origin O than a second vehicle travel lane $X_{L2}$, a vehicle TK1 (vehicle height $z_1$) travels along the first vehicle travel lane $X_{L1}$, and a vehicle TK2 (vehicle height $z_2$) travels along the second vehicle travel lane $X_{L2}$. In addition, the angle of view from the radar device 1D to the vehicle TK1 is $\gamma(z_1)$ and the angle of view from the radar device 1D to the vehicle TK2 is $\gamma(z_2)$.

The signal processing unit 11D shown in FIG. 15B includes A/D conversion units 15 and 16, a correlation calculation unit 17, an adder unit 18, a distance selection output unit 35, a vehicle height/speed template generating unit 61 for a first vehicle travel lane, a vehicle height/speed template generating unit 62 for a second vehicle travel lane, a correlation calculation unit G1 for a first vehicle travel lane, a correlation calculation unit G2 for a second vehicle travel lane, and a detection result output unit 21.

The correlation calculation unit G1 for a first vehicle travel lane includes s vehicle height/speed template correlation calculation units #1 to #NPk, a road surface reflected wave signal detecting unit 51 for a first vehicle travel lane, and an output selection unit 20A. The correlation calculation unit G2 for a second vehicle travel lane has the same structure as the correlation calculation unit G1 for a first vehicle travel lane. In the following description, the correlation calculation unit G1 for a first vehicle travel lane will be described as an example and an operation of detecting the vehicle TK1 which travels along the first vehicle travel lane $X_{L1}$ will be described.

Since the vehicle height/speed template generating unit 61 for a first vehicle travel lane and the vehicle height/speed template generating unit 62 for a second vehicle travel lane have the same operation, the operation of the vehicle height/speed template generating unit 61 for a first vehicle travel lane will be described as an example. The vehicle height/speed template generating unit 61 for a first vehicle travel lane generates the template of the vehicle (for example, the vehicle TK1) which travels along the first vehicle travel lane $X_{L1}$ according to Expression (25).

The correlation calculation unit G1 for a first vehicle travel lane calculates correlation with an output $CI(k_s, m)$ from the distance selection output unit 35 using the template from the vehicle height/speed template generating unit 61 for a first vehicle travel lane. Since the operation of the correlation calculation unit G1 for a first vehicle travel lane is the same as that of the vehicle height/speed template correlation calculation unit #s, the road surface reflected wave signal detecting unit 50C, and the output selection unit 20C according to the fourth embodiment (see FIG. 14), the description thereof will not be repeated.

The detection result output unit 21 transmits the calculation results of the correlation calculation unit G1 for a first vehicle travel lane and the correlation calculation unit G2 for a second vehicle travel lane to a traffic system (not shown) which monitors the amount of traffic on the road through a network of a predetermined interface.

Therefore, similarly to the radar devices according to the above-described embodiments, even when the reception level of the reflected wave signal from the vehicles which travel along a plurality of vehicle travel lanes is low due to the shape of the vehicles, the radar device 1D can improve the accuracy of estimating the speed and height of each vehicle or the length of each vehicle and determine the type of vehicle.

Sixth Embodiment

Radar Device 1E

In the above-described embodiments, it is premised that the radar device is installed at a predetermined height H from the road surface GND. However, even when a moving body (for example, a vehicle) is provided with the radar device according to this disclosure, the radar device can estimate the distance and azimuth of a stationary target using the template of a variation in the phase of a reflected wave signal corresponding to the distance relationship between the target and the radar device and the relative speed relationship between the target and the moving body provided with the radar device and the correlation between a transmission signal and a reflected transmission signal (received signal) from the target.

Next, as the sixth embodiment, an embodiment in which the radar device according to this disclosure is provided in the vehicle will be described.

Figure 16:
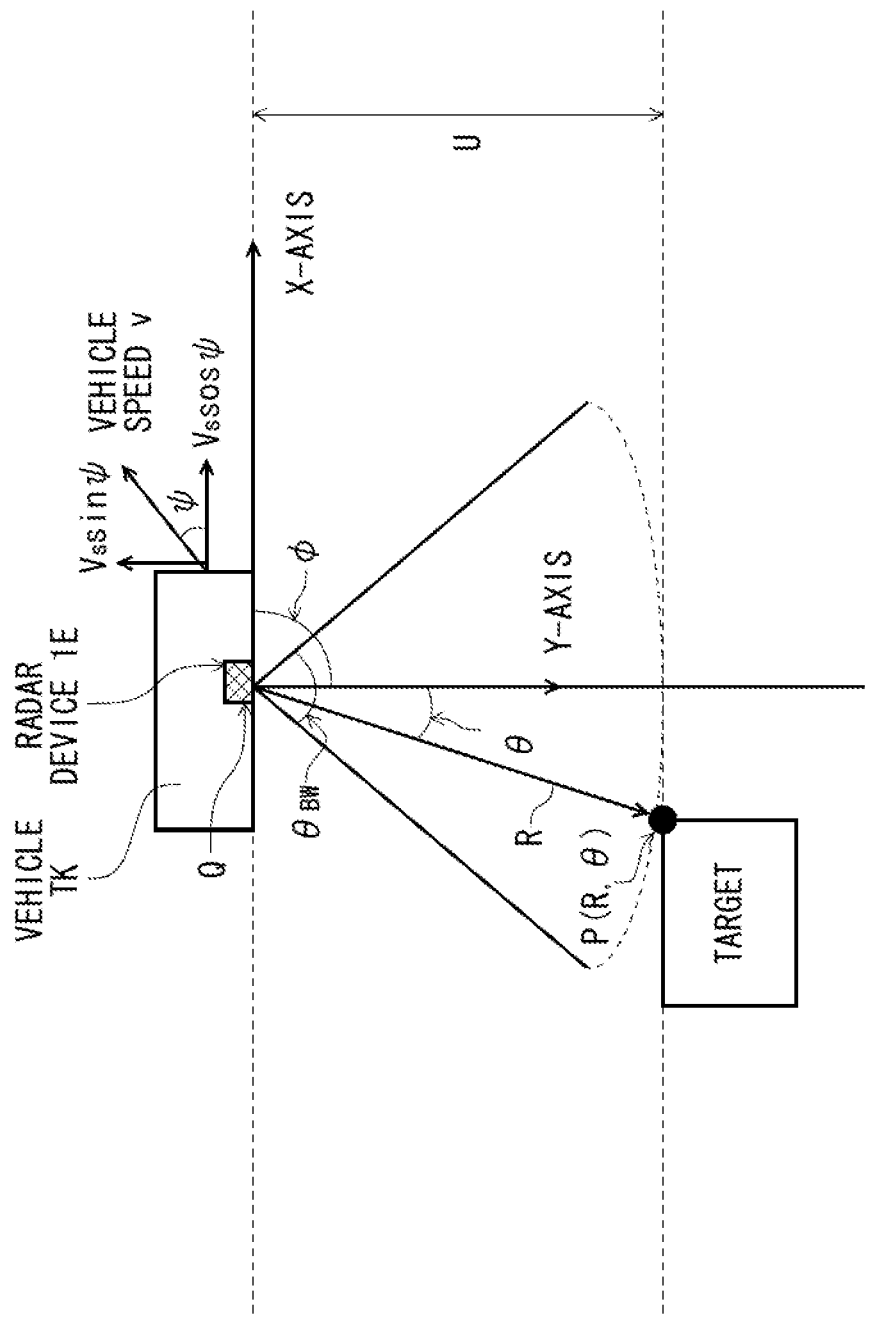
FIG. 16 is a schematic diagram illustrating the arrangement state of a vehicle provided with a radar device according to a sixth embodiment.

FIG. 16 is a schematic diagram illustrating the arrangement state of a vehicle TK provided with a radar device 1E according to the sixth embodiment. The radar device 1E is provided on the side, front, and rear of the vehicle TK such that the antenna directionality of the radar device 1E is aligned with a side direction, an obliquely forward direction, or an obliquely backward direction. In FIG. 16, the radar device 1E according to this embodiment is provided on the side of the vehicle.

Figure 17:
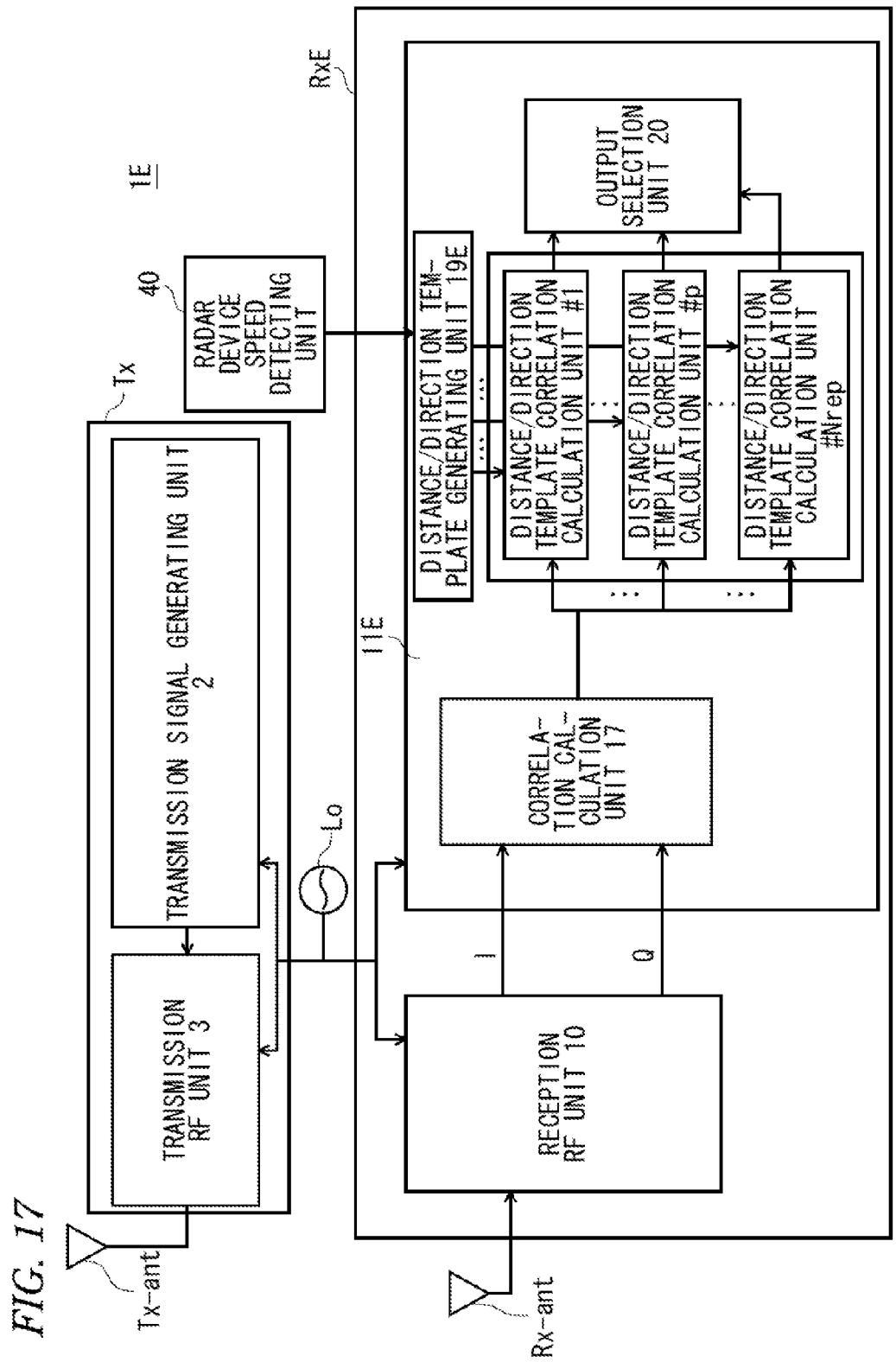
FIG. 17 is a block diagram illustrating briefly the internal structure of the radar device according to the sixth embodiment.
Figure 18:
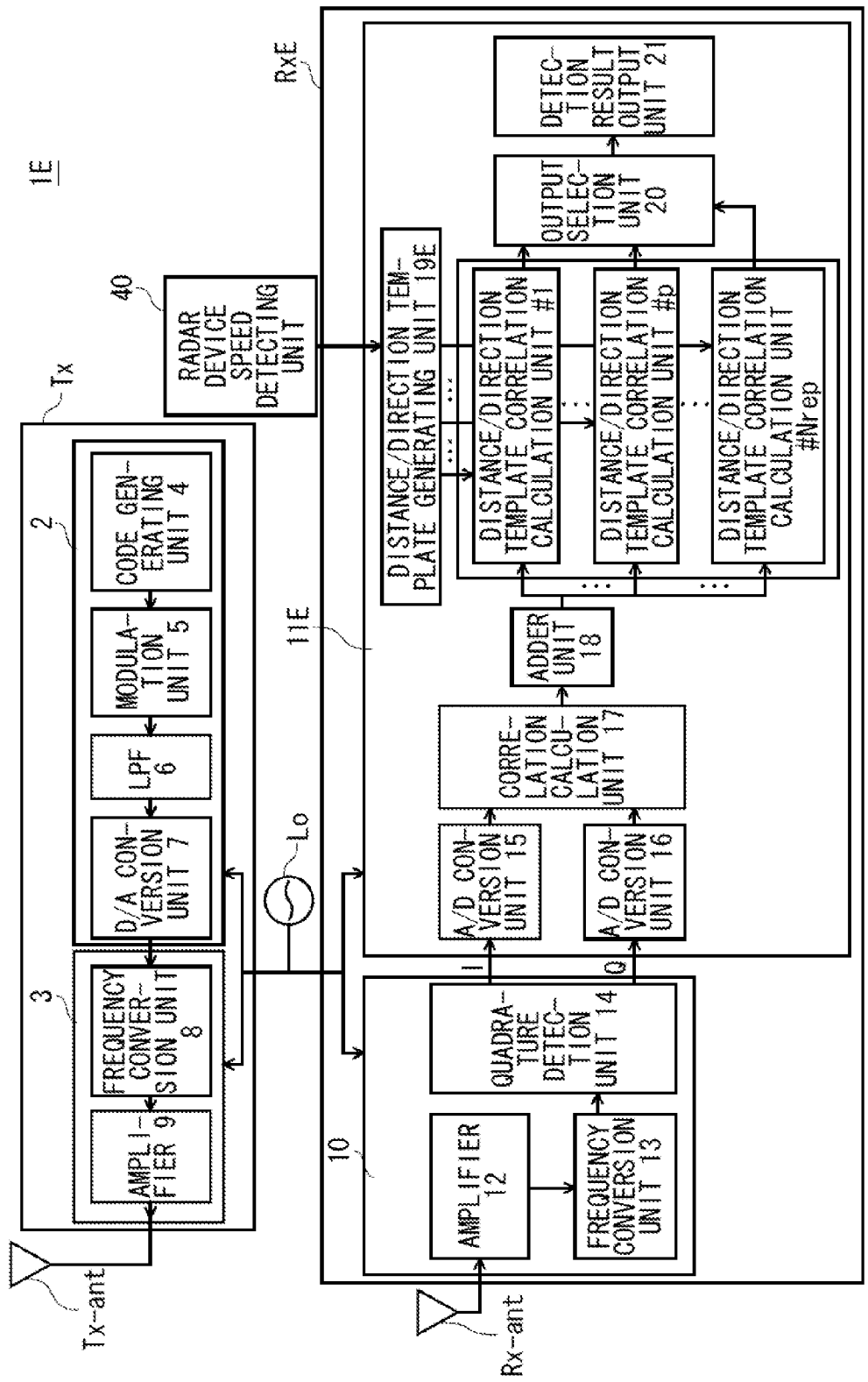
FIG. 18 is a block diagram illustrating in detail the internal structure of the radar device according to the sixth embodiment.

FIG. 17 is a block diagram illustrating briefly the internal structure of the radar device 1E according to the sixth embodiment. FIG. 18 is a block diagram illustrating in detail the internal structure of the radar device 1E according to the sixth embodiment. A transmission section Tw and a transmission period Tr of a radar transmission signal of the radar device 1E according to this embodiment are the same as the transmission section Tw and the transmission period Tr of the radar transmission signal according to the radar device 1 shown in FIG. 4.

FIG. 16 is a top view illustrating the vehicle TK provided with the radar device 1E. Here, it is assumed that the main beam direction of each of a transmission antenna and a reception antenna of the radar device 1E is the Y-axis direction and a direction perpendicular to the main beam direction of the transmission antenna of the radar device 1E is the X-axis. In addition, it is assumed that the center of the open surface of each of the transmission antenna and the reception antenna of the radar device 1E is the origin where the X-axis and the Y-axis intersect each other.

In FIG. 16, a point Q is the origin $(X, Y)=(0, 0)$. In FIG. 16, the radar device 1E is provided on the side surface of the vehicle and the traveling direction of the vehicle TK is aligned with the X-axis. However, the traveling direction of the vehicle TK may not be aligned with the X-axis.

When a target to be detected stands still, the speed vector of the vehicle TK provided with the radar device 1E is $V_s$, and the angle between the speed vector and the X-axis is $\psi$, an x-axis component of the speed vector of the vehicle TK is $V_s \cos \psi$ and a Y-axis component thereof is $V_s \sin \psi$. Here, $\psi$ is a parameter which depends on the attachment angle of the radar device 1E to the vehicle TK and is a known fixed value.

It is assumed that the main beam direction of the radar device 1E is inclined at an angle $\phi$ with respect to the side surface of the vehicle. In FIG. 16, the inclination angle $\phi$ of the radar device 1E is 90°. However, the main beam direction of the radar device 1E is not limited to the inclination angle $\phi=90°$ of the radar device 1E.

The radar device 1E transmits the radar transmission signal generated by a radar transmitting unit Tx from a transmission antenna Tx-ant. The radar transmission signal is reflected from the target and a reception antenna Rx-Ant receives the reflected wave signal.

The radar device 1E performs signal processing for the received reflected wave signal to estimate a distance R from the radar device 1E to a vehicle reflection portion $P(R, \theta)$ of the target and the azimuth θ of the target which is in a stationary state as viewed from the radar device 1E. Here, R is the distance from the radar device 1E to the vehicle reflection portion P of the target and θ is the angle between the Y-axis and the vehicle reflection portion P of the target.

Next, the structure of each unit of the radar device 1E will be described briefly.

The radar device 1 shown in FIG. 17 includes a reference signal oscillator Lo, a radar device speed detecting unit 40, the radar transmitting unit Tx, and a radar receiving unit RxE. The radar transmitting unit Tx includes a transmission signal generating unit 2 and a transmission RF unit 3 to which the transmission antenna Tx-ant is connected. The reference signal oscillator Lo is connected to the radar transmitting unit Tx and the radar receiving unit RxE and commonly supplies the signal from the reference signal oscillator Lo to the radar transmitting unit Tx and the radar receiving unit RxE to synchronize the processes of the radar transmitting unit Tx and the radar receiving unit RxE.

The radar receiving unit RxE includes a reception RF unit 10 to which the reception antenna Rx-ant is connected and a signal processing unit 11E. The signal processing unit 11E includes at least a correlation calculation unit 17, a distance/direction template generating unit 19E, a total of Nrep distance/speed template correlation calculation units #1 to #Nrep (p=1 to Nrep), and an output selection unit 20.

(Radar Transmitting Unit)

The structure and operation of the radar transmitting unit Tx are the same as those in the above-described embodiments and the description thereof will not be repeated.

(Radar Receiving Unit)

Next, the structure of each unit of the radar receiving unit Rx will be described with reference to FIG. 18.

The radar receiving unit Rx shown in FIG. 18 includes the reception RF unit 10 to which the reception antenna Rx-ant is connected and the signal processing unit 11E. The reception RF unit 10 includes an amplifier 12, a frequency conversion unit 13, and a quadrature detection unit 14. The signal processing unit 11E includes A/D conversion units 15 and 16, the correlation calculation unit 17, an adder unit 18, the distance/direction template generating unit 19E, Nrep distance/speed template correlation calculation units #p (p is in the range of 1 to Nrep and Nrep is a predetermined natural number), the output selection unit 20, and a detection result output unit 21.

The radar device speed detecting unit 40 detects the moving speed and moving direction of the moving body provided with the radar device 1E and outputs the moving speed and moving direction to the distance/direction template generating unit 19E. For example, when the moving body is the vehicle TK, the radar device speed detecting unit 40 detects the number of rotations of wheels per unit time and detects the moving speed. In addition, the radar device speed detecting unit 40 converts the amount of rotation of a steering wheel into the amount of inclination of wheels to detect the moving direction. It is assumed that the speed vector of the moving body detected by the radar device speed detecting unit 40 is Vs.

The radar receiving unit RxE periodically calculates a signal processing section of the signal processing unit 11 for each transmission period Tr.

Next, the operation of each unit of the radar receiving unit RxE will be described in detail.

The operation of the reception RF unit 10, and the A/D conversion units 15 and 16, the correlation calculation unit 17, and the adder unit 18 of the signal processing unit 11E is the same as that in the above-described embodiments and the description thereof will not be repeated.

The distance/direction template generating unit 19E generates a distance/speed template using parameters indicating the positional relationship between the radar device 1E and the target, on the basis of the following properties.

Next, the properties on which the distance/direction template generating unit 19E focuses attention will be described.

In the reflected wave signal from the target while the vehicle TK is moving at the speed Vs, the relative speed $V_R$ of the target as viewed from the radar device 1E at the distance R from the radar device 1E to the vehicle reflection portion P(R, θ) is detected according to Expression (34).

[Expression 34]

$$V_R(\theta) = -V_s \cos\psi \sin\theta - V_s \sin\psi \cos\theta \quad (34)$$

The relative speed detected by the radar device 1E varies depending on the azimuth angle θ between the Y-axis direction and the direction from the radar device 1E to the vehicle reflection portion P of the target shown in FIG. 16, according to Expression (34). Here, an X-axis component $V_s \cos\psi$ and a Y-axis component $V_s \sin\psi$ of the moving speed Vs of the vehicle TK are the detection values of the radar device speed detecting unit 40 and an unknown parameter is the azimuth angle θ between the Y-axis direction and the direction from the radar device 1E to the vehicle reflection portion P of the target shown in FIG. 16.

In addition, the azimuth angle θ between the Y-axis direction and the direction from the radar device 1E to the vehicle reflection portion P of the target shown in FIG. 16 varies depending on time, according to Expression (35).

[Expression 35]

$$\frac{d\theta}{dt} = \frac{-V_s \cos\psi \cos\theta - V_s \sin\psi \sin\theta - \theta V_R(\theta)}{R} \quad (35)$$

The distance/direction template generating unit 19E generates a variation in the phase of the reflected wave signal corresponding to combinations of a plurality of distances $R_u$ and directions θq as a template $REP_{\#p}[R_u, \theta q]$ for the target on the basis of the above-mentioned properties, according to Expression (36).

In Expression (36), #p is the ordinal number of combinations of parameter sets of a total of Nrep distances $R_u$ and directions θq and is in the range of #1 to #Nrep. In addition, u×q=Nrep is established among u, q, and Nrep which are natural numbers. Furthermore, $n_i$ is the number of samples of a phase component of the template $REP_{\#p}[R_u, \theta q]$. A variation in the direction $\theta_q$ over time is represented by Expression (37).

[Expression 36]

$$REP_{\#p}[R_u, \theta_q](n_i) = \exp\left\{-j \frac{4\pi(n_i N_c T_r)\left(V_s\cos\psi\sin\left(\theta + n_i N_c T_r \frac{d\theta_q}{dt}\right) + V_s\sin\psi\cos\left(\theta + n_i N_c T_r \frac{d\theta_q}{dt}\right)\right)}{\lambda}\right\} \quad (36)$$

[Expression 37]

$$\frac{d\theta_q}{dt} = \frac{-V_s\cos\psi\cos\theta_q - V_s\sin\psi\sin\theta_q - \theta_q V_R(\theta_q)}{R_u} \quad (37)$$

The distance/direction template generating unit 19E may quantize the variation in the phase of the reflected wave signal corresponding to combinations of a plurality of distances $R_u$ and directions $\theta q$ with a predetermined number of bits (for example, 1 bit or 2 bits) to generate the template. When the variation is quantized with 1 bit, the template can be represented by a binary number. When the variation is quantized with 2 bits, the template can be represented by a quaternary number. Therefore, it is possible to reduce the storage capacity of the distance/direction template generating unit 19E and reduce the circuit size of each of the vehicle distance/speed template correlation calculation units #1 to #Nrep.

The output selection unit 20 determines whether there is a correlation value HV_CI(k, p, m) greater than a predetermined threshold value TH_Level on the basis of the correlation values HV_CI(k, p, m) from a total of Nrep distance/speed template correlation calculation units #p (p is a natural number from 1 to Nrep). When it is determined that there is a correlation value HV_CI(k, p, m) greater than the predetermined threshold value TH_Level, that is, when Expression (38) is established, the output selection unit 20 outputs the distance $R_u$ and the direction $\theta q$ of the distance/speed template as the detection values of the distance and direction of the target to the detection result output unit 21.

[Expression 38]

$$HV\_CI(k, p_{sel}, m) > TH\_Level \quad (38)$$

In this way, when a moving body (for example, a vehicle) is provided with the radar device 1E according to this embodiment, the radar device 1E can estimate the distance and azimuth angle of a stationary target using the template of a variation in the phase of the reflected wave signal corresponding to the distance relationship between the target and the radar device 1E and the relative speed relationship between the target and the moving body provided with the radar device 1E and the correlation between the transmission signal and the reflected transmission signal (received signal) from the target.

Although the embodiments have been described thus far by reference to the drawings, the invention is, needless to say, not confined to the embodiments. It is manifest that the persons skilled in the art can conceive various alterations or modifications of the embodiments within a category described in connection with the claims and that the alterations or modifications naturally fall within a technical scope of the invention.

This invention is based on Japanese Patent Application (Japanese Patent Application No. 2012-062493) filed on Mar. 19, 2012, the content of which is incorporated herein by reference.

INDUSTRIAL APPLICABILITY

This disclosure is useful as a radar device which improves the accuracy of determining the type of vehicle, regardless of the shape of the vehicle.

DESCRIPTION OF REFERENCE NUMERALS AND SIGNS 1, 1A, 1B, 1C, 1D: RADAR DEVICE
2: TRANSMISSION SIGNAL GENERATING UNIT
3: TRANSMISSION RF UNIT
4: CODE GENERATING UNIT
5: MODULATION UNIT
6: LPF
7: D/A MODULATION UNIT
8, 13: FREQUENCY CONVERSION UNIT
9, 12: AMPLIFIER
10: RECEPTION RF UNIT
11, 11A, 11B, 11C, 11D: SIGNAL PROCESSING UNIT
14: QUADRATURE MODULATION UNIT
15, 16: A/D CONVERSION UNIT
17: CORRELATION CALCULATION UNIT
18: ADDER UNIT
19: VEHICLE HEIGHT/SPEED TEMPLATE GENERATING UNIT
20, 20A: OUTPUT SELECTION UNIT
21: DETECTION RESULT OUTPUT UNIT
35: DISTANCE SELECTION OUTPUT UNIT
50: ROAD SURFACE REFLECTED WAVE SIGNAL DETECTING UNIT
1, #p, #Nrep, #Npk: VEHICLE HEIGHT/SPEED TEMPLATE CORRELATION CALCULATION UNIT
Rx, RxA, RxB, RxC: RADAR RECEIVING UNIT
Tx: RADAR TRANSMITTING UNIT

The invention claimed is:

1. A radar device configured to be installed at a position which is at a predetermined height from a road surface, comprising:
a radar transmitting unit configured to transmit a radio-frequency radar transmission signal from the position which is at the predetermined height to the road surface from a transmission antenna which is inclined in a direction of a predetermined depression angle; and
a radar receiving unit configured to estimate a position parameter and a speed of a vehicle which travels on the road surface, using a reflected wave signal which is the radar transmission signal reflected from the vehicle which travels on the road surface,
wherein the radar receiving unit includes:
a correlation calculation unit configured to calculate correlation on the basis of the reflected wave signal and a transmission code of the radar transmission signal;
a template generating unit configured to generate a variation in a phase component of the reflected wave signal corresponding to N position parameters and speeds of the vehicle as N templates;
N template correlation calculation units configured to calculate correlation on the basis of any one of the generated N templates and a correlation value between the reflected wave signal and the transmission code of the radar transmission signal; and
an output selection unit configured to determine a type of the vehicle, using the position parameter and the speed of the vehicle corresponding to any one of the generated N templates, on the basis of outputs from the N template correlation calculation units.

2. The radar device according to claim 1,
wherein the position parameter is a height of the vehicle or a distance between the radar device and the vehicle.

3. The radar device according to claim 1,
wherein the radar receiving unit further includes an adder unit configured to add the correlation value between the reflected wave signal and the transmission code of the radar transmission signal a predetermined number of times, and
each of the template correlation calculation units is configured to calculate the correlation on the basis of an output of the adder unit and any one of the generated N templates.

4. The radar device according to claim 1,
wherein, where there are a plurality of outputs greater than a predetermined threshold value among the outputs of the N template correlation calculation units, the output selection unit is configured to select a maximum value of the outputs greater than the predetermined threshold value as an estimated value.

5. The radar device according to claim 1,
wherein, where there are a plurality of outputs greater than a predetermined threshold value among the outputs of the N template correlation calculation units, the output selection unit is configured to perform an interpolation process using the plurality of outputs greater than the predetermined threshold value and select an output after the interpolation process as an estimated value.

6. The radar device according to claim 1,
wherein each template generating unit is configured to generate a variation in a real component of the phase component in the reflected wave signal corresponding to the N position parameters and speeds of the vehicle as the N templates.

7. The radar device according to claim 6,
wherein each template generating unit is configured to generate a variation in an imaginary component of the phase component in the reflected wave signal corresponding to the N position parameters and speeds of the vehicle as the N templates.

8. The radar device according to claim 3,
wherein each template correlation calculation unit includes:
a down sampling unit configured to down-sample the output of the adder unit at a predetermined interval; and
a correlation calculation unit configured to calculate correlation on the basis of the down-sampled output of the adder unit and any one of the generated N templates.

9. The radar device according to claim 3,
wherein the direction of the predetermined depression angle is a direction in which a path of the radar transmission signal between the radar device and the vehicle which travels immediately below the radar device is included in a range of a beam width of the radar transmission signal, and
the template generating unit is configured to generate Np (<N) templates corresponding to the position parameter and the speed of the vehicle, using the position parameter of the vehicle when the path of the radar transmission signal is included in a range bin at each sampling time.

10. The radar device according to claim 9,
wherein the radar receiving unit further includes a distance selection output unit configured to output the output of the adder unit to the Np (<N) template correlation calculation units according to the generated Np templates.

11. The radar device according to claim 3,
wherein the radar receiving unit further includes a road surface reflected wave signal detecting unit configured to detect a road surface reflected wave signal from the road surface on the basis of the output of the adder unit and detects a time when the vehicle starts to pass through a detection area corresponding to the range of a beam width of the radar transmission signal, and
each template correlation calculation unit is configured to calculate the correlation on the basis of each output of the adder unit after a detection time of the road surface reflected wave signal.

12. The radar device according to claim 3,
wherein the radar receiving unit further includes a road surface reflected wave signal detecting unit configured to detect a road surface reflected wave signal from the road surface on the basis of the output of the adder unit and detect a time when the vehicle starts to pass through a detection area corresponding to the range of the beam width of the radar transmission signal and a time when a passage of the vehicle through the detection area ends, and
the output selection unit is configured to select, as an estimated value, the speed of the vehicle corresponding to any one of the generated N templates on the basis of the outputs of the N template correlation calculation units and estimate a length of the vehicle on the basis of the passage start time and the passage end time.

13. The radar device according to claim 1,
wherein the position which is at the predetermined height from the road surface is a pole above a vehicle travel lane or a post on a side of the road.

* * * * *